US009112701B2

(12) United States Patent
Sano et al.

(10) Patent No.: US 9,112,701 B2
(45) Date of Patent: Aug. 18, 2015

(54) WEARABLE DEVICE, AUTHENTICATION METHOD, AND RECORDING MEDIUM

(75) Inventors: Akane Sano, Tokyo (JP); Masaaki Tsuruta, Tokyo (JP); Nozomu Ozaki, Kanagawa (JP); Masamichi Asukai, Kanagawa (JP); Taiji Ito, Kanagawa (JP); Akinobu Sugino, Kanagawa (JP); Hidehiko Sekizawa, Tokyo (JP); Yoichiro Sako, Tokyo (JP)

(73) Assignee: Sony Corporation, Tokyo (JP)

( * ) Notice: Subject to any disclaimer, the term of this patent is extended or adjusted under 35 U.S.C. 154(b) by 1572 days.

(21) Appl. No.: 12/069,501

(22) Filed: Feb. 11, 2008

(65) Prior Publication Data

US 2008/0216171 A1 Sep. 4, 2008

(30) Foreign Application Priority Data

Feb. 14, 2007 (JP) ................. 2007-033990

(51) Int. Cl.
| | |
|---|---|
| G06F 7/04 | (2006.01) |
| G06F 12/00 | (2006.01) |
| G06F 12/14 | (2006.01) |
| G06F 13/00 | (2006.01) |
| G06F 17/30 | (2006.01) |
| G11C 7/00 | (2006.01) |
| H04L 9/32 | (2006.01) |
| G06F 21/32 | (2013.01) |
| G06F 21/62 | (2013.01) |

(52) U.S. Cl.
CPC ........ *H04L 9/32* (2013.01); *G06F 21/32* (2013.01); *G06F 21/629* (2013.01); *G06F 2221/2141* (2013.01); *G06F 2221/2149* (2013.01)

(58) Field of Classification Search
None
See application file for complete search history.

(56) References Cited

U.S. PATENT DOCUMENTS

| | | | |
|---|---|---|---|
| 6,703,918 B1 | 3/2004 | Kita | |
| 6,957,771 B2 * | 10/2005 | Norris, Jr. | 235/382 |
| 2002/0069211 A1 | 6/2002 | Kondo et al. | |
| 2003/0023874 A1 * | 1/2003 | Prokupets et al. | 713/201 |
| 2005/0071647 A1 | 3/2005 | Fujinuma et al. | |
| 2005/0100197 A1 * | 5/2005 | Kita | 382/124 |
| 2005/0270140 A1 * | 12/2005 | Oh | 340/5.83 |
| 2005/0280545 A1 | 12/2005 | Ryou | |
| 2006/0224046 A1 * | 10/2006 | Ramadas et al. | 600/300 |
| 2009/0009284 A1 | 1/2009 | Sako | |

FOREIGN PATENT DOCUMENTS

| | | |
|---|---|---|
| CN | 1292321 C | 12/2006 |
| JP | 06-314259 A | 11/1994 |
| JP | 11-266430 A | 9/1999 |
| JP | 2001-167054 A | 6/2001 |
| JP | 2001-326898 A | 11/2001 |
| JP | 2002-132739 A | 5/2002 |
| JP | 2002-31431 A | 10/2002 |

(Continued)

*Primary Examiner* — Nadia Khoshnoodi
(74) *Attorney, Agent, or Firm* — Wolf, Greenfield & Sacks, P.C.

(57) ABSTRACT

A wearable device is provided that is used while being worn on a body of a user. The wearable device includes a biometric-information authentication portion that acquires biometric information from the user for biometric authentication. The wearable device acquires biometric information from a portion in contact with or in the vicinity of the user's body to perform the biometric authentication without requesting the user to operate for the biometric authentication.

17 Claims, 14 Drawing Sheets

(56) References Cited

FOREIGN PATENT DOCUMENTS

| | | |
|---|---|---|
| JP | 2003-079591 A | 3/2003 |
| JP | 2003-223422 A | 8/2003 |
| JP | 2004-096224 A | 3/2004 |
| JP | 2004-194996 A | 7/2004 |
| JP | 2005-071225 A | 3/2005 |
| JP | 2005-346307 A | 12/2005 |
| JP | 2006-034803 A | 2/2006 |
| JP | 2006-087829 A | 4/2006 |
| JP | 2006-126891 A | 5/2006 |
| JP | 2006-165987 A | 6/2006 |
| JP | 2006-172153 A | 6/2006 |
| JP | 2007-003745 A | 1/2007 |
| WO | WO 2006/113879 A3 | 10/2006 |

\* cited by examiner

WEARABLE DEVICE, AUTHENTICATION METHOD, AND RECORDING MEDIUM

CROSS REFERENCES TO RELATED APPLICATIONS

The present invention contains subject matter related to Japanese Patent Application JP 2007-033990 filed in the Japan Patent Office on Feb. 14, 2007, the entire contents of which being incorporated herein by reference.

BACKGROUND OF THE INVENTION

1. Field of the Invention

The present invention relates to a wearable device, an authentication method, and a recording medium.

2. Description of the Related Art

A variety of wearable devices have recently become prevalent. The wearable devices are to be used while being worn on the body of the user. Examples of the wearable devices include a head mounted display, a headphone, a wrist sphygmomanometer used around the wrist, and a wristwatch.

In connection with the wearable devices, a technology has been developed to provide the wearable device with a sensor that detects whether the device is worn or not, and use the detection results to control the device operation. JP 2004-96224 discloses a technology in which a device worn on the head such as a head mount display is provided with a detector for detecting the head movement, and the detection results are used to control the power supply.

SUMMARY OF THE INVENTION

Unfortunately, the detector simply detects whether the wearable device is worn or not in the technologies proposed in the related art in which the wearable device is provided with the sensor to detect whether the device is worn or not, and the detection results are used to control the device operation. In the known wearable devices, therefore, once the device wear is detected, the wearable device may function even when the device is worn by a user not a "person." In addition, the known wearable device may not identify the users of the device, so the device may not control the functions available for each user.

The present invention addresses the above-identified problems and provides a new and improved wearable device, authentication method, and recording medium that may identify the user.

According to an embodiment of the present invention, there is provided a wearable device that is used while being worn on a body of a user, the wearable device including a biometric-information authentication portion that acquires biometric information from the user for biometric authentication.

The wearable device is a device that is to be used while being worn on the body of the user. The described wearable device includes at least a biometric-information authentication portion. The biometric-information authentication portion may acquire biometric information from the user, and use the acquired biometric information for biometric authentication. The biometric-information authentication portion is included in the wearable device, thereby acquiring biometric information from a portion in contact with the user's body and also acquiring biometric information from a portion in the vicinity of the user's body. In addition, the biometric-information authentication portion may not acquire the biometric information from the user's specific region, but may acquire the user body's movement as the biometric information. The biometric information may be defined as information associated with the user's living body. Examples of the biometric information include the pulse, the iris, the fingerprints, the face, and the walking pattern. This configuration may biometrically authenticate and identify the user without requesting the user for handling or operation for authentication.

The wearable device may further include a device-wear detection portion detecting whether the device is worn or not, wherein the biometric-information authentication portion may perform the biometric authentication when the device-wear detection portion detects the device wear, and the biometric-information authentication portion may perform no biometric authentication when the device-wear detection portion detects no device wear.

This configuration may allow the biometric-information authentication portion to perform the biometric authentication only when the device wear is detected, thereby reducing the power consumption associated with the biometric authentication.

The biometric authentication may perform the biometric authentication again after a predetermined amount of time has passed since the biometric-information authentication portion first biometrically authenticates the user.

This configuration may identify the user flexibly even when the user is changed after the first biometric authentication after the device is worn.

The biometric authentication portion may perform the biometric authentication regularly.

This configuration may identify the user flexibly even when the user is changed more than once after the biometrical authentication.

The wearable device may further include: a function portion that controls execution of one or more functions; and an operation portion that performs an operation to the function portion, wherein the biometric-information authentication portion may perform the biometric authentication when the operation portion performs an operation.

This configuration may identify the user flexibly for each function execution even when the user is changed more than once after the biometrical authentication.

The wearable device may further include a storage portion that stores profile data including the biometric information for each user, wherein the biometric-information authentication portion may perform the biometric authentication according to the biometric information acquired from the user's body and the profile data stored in the storage portion.

This configuration may allow the wearable device to be shared by a plurality of users and identify the users.

The wearable device may further include a function portion that controls execution of one or more functions, wherein the profile data further may include function information in which it is possible to set enabling or disabling of the one or more functions for each function, and the function portion may use the function information of the profile data to enable or disable the one or more functions for each function.

This configuration may control the functions available for each user.

The wearable device may further include a function portion that controls execution of one or more functions, wherein the storage portion may store one or more sets of content data performed by the function portion, the profile data may further include content-data authority information associated with execution of the content data, and the function portion may use content information included in the profile data to enable or disable the one or more functions for each set of content data and for each function.

This configuration may control the content data and functions available for each user.

The wearable device may further include a function portion that controls execution of one or more functions, wherein the storage portion may store one or more sets of content data performed by the function portion, each set of content data may include user information that defines a user who is permitted to use the content data, and the function portion may enable or disable the one or more functions for each set of content data and for each function according to the profile data and the user information.

This configuration may control the content data and functions available for each user.

The wearable device may further include a communication portion that communicates with at least one external device, wherein the profile data further may include communication information that defines a predetermined external device for communication, and the communication portion may communicate with the predetermined external device according to the communication information of the profile data.

This configuration may allow the wearable device to cooperate with an external device.

When the biometric-information authentication portion performs the biometric authentication, the communication portion may communicate with the predetermined external device to notify the external device of the biometric authentication that has been performed.

This configuration may allow the external device to be notified of the biometric authentication that has been performed and thus the external device to understand the use of the wearable device.

According to the embodiments of the present invention described above, there is provided an authentication method in a wearable device, the wearable device being used while being worn on a body of a user, the method including the steps of: detecting whether the device is worn or not; and acquiring biometric information from the user for biometric authentication when the device wear is detected in the detection step, and acquiring no biometric information from the user when no device wear is detected.

This method may biometrically authenticate and identify the user without requesting the user for handling or operation for authentication.

According to the embodiments of the present invention described above, there is provided a recording medium that records a program for use in a wearable device, the wearable device being used while being worn on a body of a user, the recording medium recording a program to allow a computer to function as means including: means for detecting whether the device is worn or not; and means for acquiring biometric information from the user for biometric authentication when the detection means detects the device wear, and for acquiring no biometric information from the user when the detection means detects no device wear.

This program may biometrically authenticate and identify the user without requesting the user for handling or operation for authentication.

According to the embodiments of the present invention described above, the user may be biometrically authenticated and identified without being requested for handling or operation for authentication.

DETAILED DESCRIPTION OF THE PREFERRED EMBODIMENTS

Figure 1:
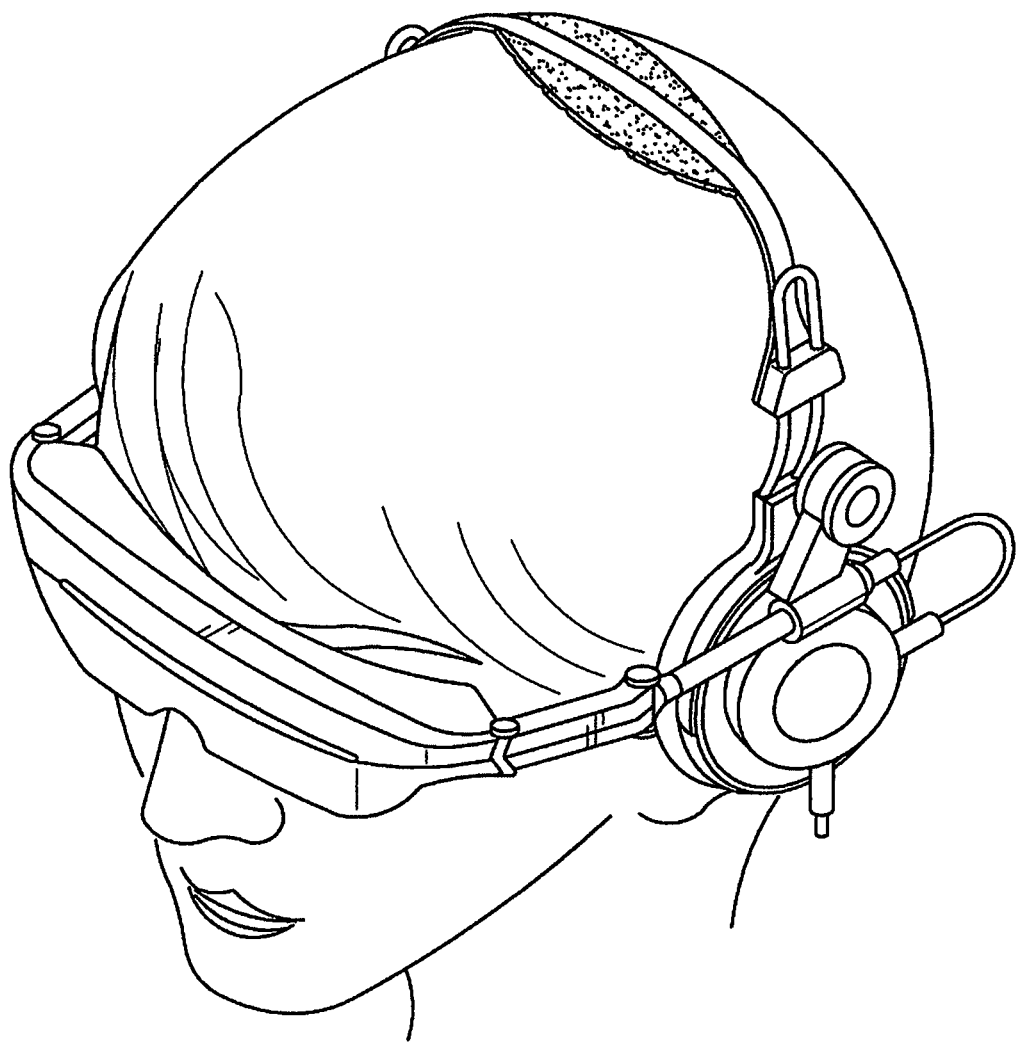
FIG. 1 illustrates a first example wearable device in accordance with an embodiment of the present invention.

Hereafter, preferred embodiments of the present invention will be described in detail with reference to the appended drawings. Note that in this specification and the appended drawings, structural elements that have substantially the same functions and structures are denoted with the same reference numerals and a repeated explanation of these structural elements is omitted.

(An Example Wearable Device in Accordance with an Embodiment of the Present Invention)

Figure 2:
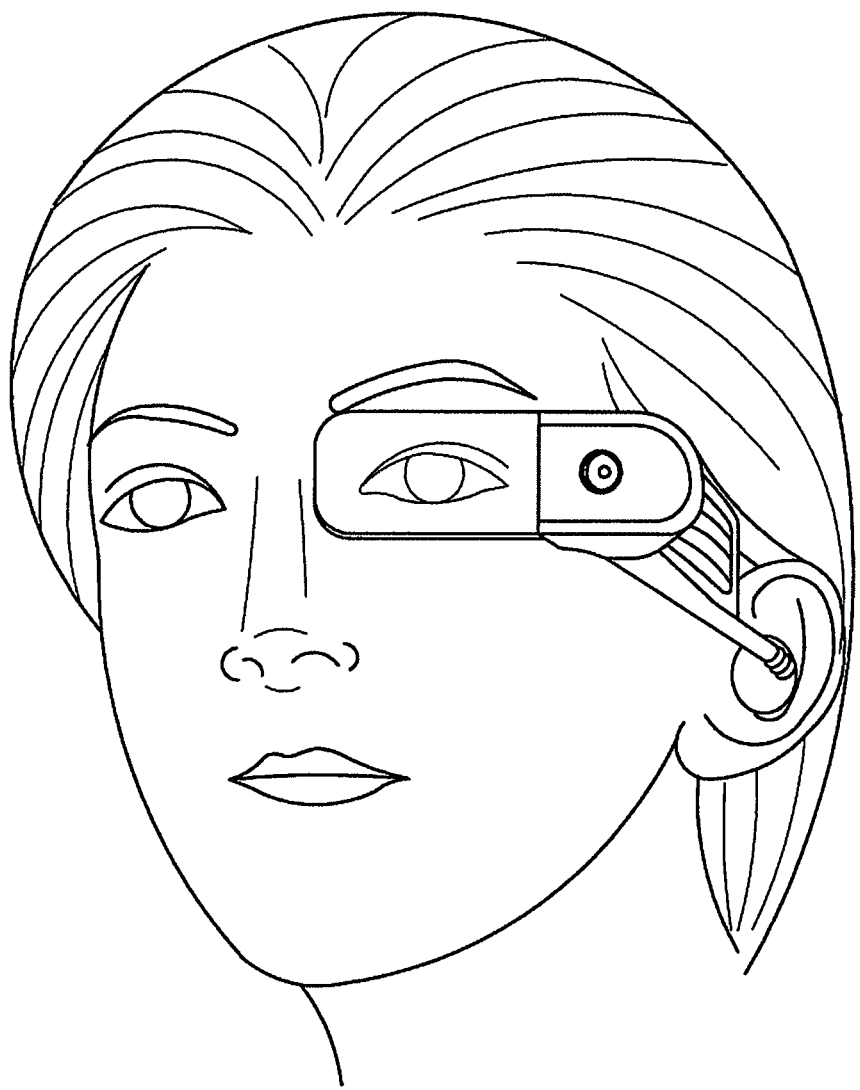
FIG. 2 illustrates a second example wearable device in accordance with an embodiment of the present invention.
Figure 3:
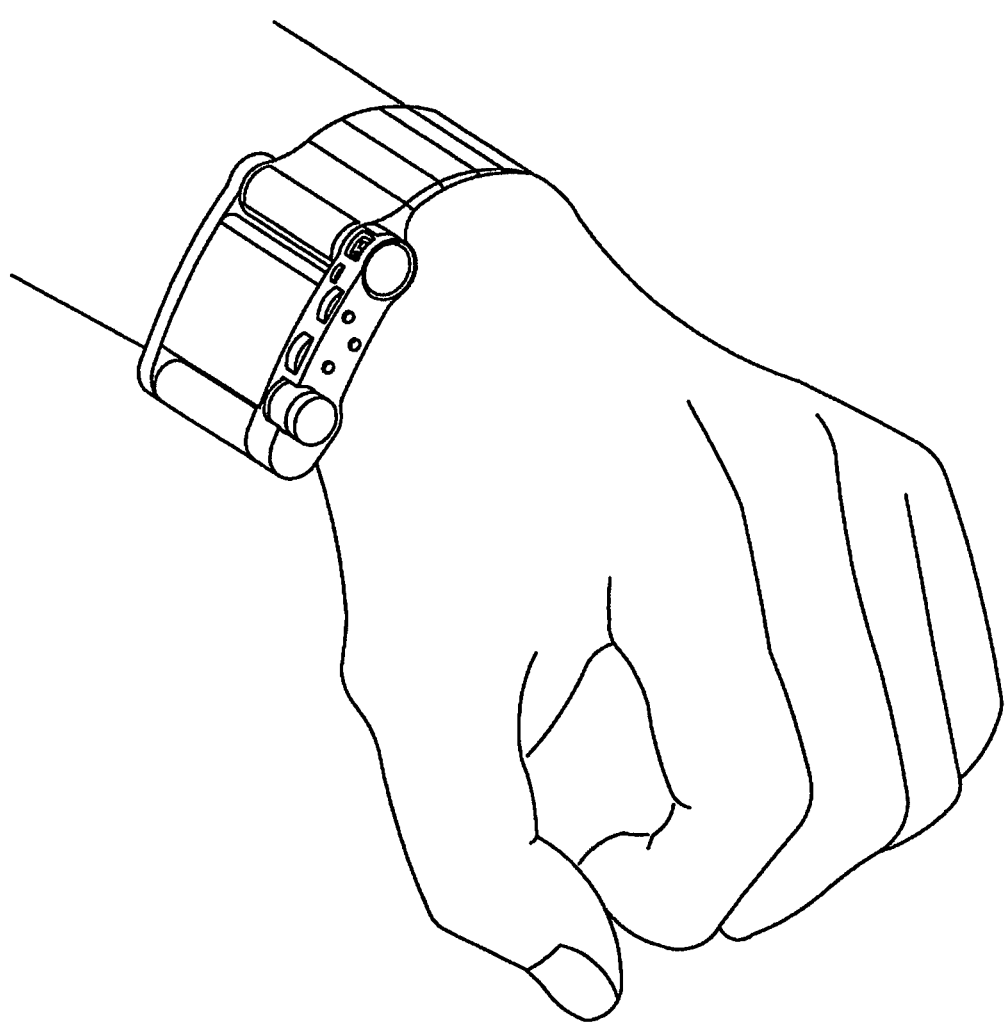
FIG. 3 illustrates a third example wearable device in accordance with an embodiment of the present invention.

A wearable device in accordance with an embodiment of the present invention will be illustrated. FIGS. 1 to 3 illustrate an example wearable device in accordance with an embodiment of the present invention.

The wearable device is a device that is to be used while being worn on the body of the user. Examples of the wearable devices in accordance with an embodiment of the present invention include a head mount display in FIG. 1, a wearable camera in FIG. 2, and a wrist-wearable display in FIG. 3. A wearable device in accordance with an embodiment of the present invention may be applied to devices worn on the head as shown in FIGS. 1 and 2 and a device worn on the wrist as shown in FIG. 3, and may also be applied to a device included in a structure worn on a hand such as a glove, a device included in a structure covering a portion of the body such as clothes, and the like. A wearable device in accordance with an embodiment of the present invention will be described below.

(First Embodiment)

Figure 4:
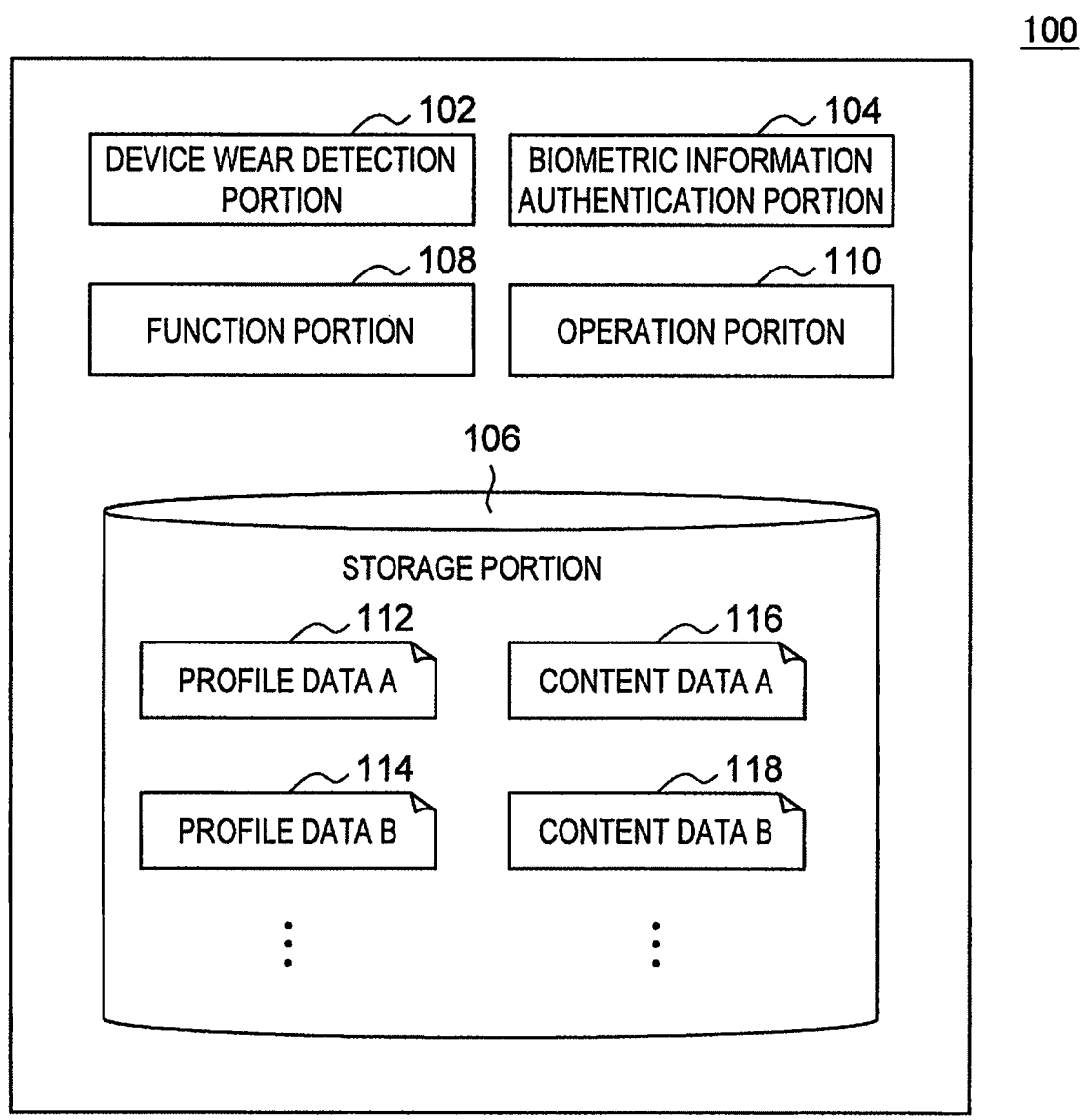
FIG. 4 is a block diagram of a wearable device in accordance with a first embodiment of the present invention.

FIG. 4 is a block diagram a wearable device in accordance with a first embodiment of the present invention.

With reference to FIG. 4, a wearable device 100 includes a device-wear detection portion 102, a biometric-information authentication portion 104, a storage portion 106, a function portion 108, and an operation portion 110. The wearable device 100 may also include a control portion (not shown), such as a micro processing unit (MPU), that controls the entire wearable device 100, a power supply portion (not shown), such as a lithium-ion secondary battery, that supplies power to each structural element, and a display portion (not shown) that displays a character, an image, and the like.

The device-wear detection portion 102 may detect whether the user wears the wearable device 100 or not. The device-wear detection portion 102 detects the device wear by detecting a temperature change, a humidity change, an impedance change, on/off of a switch attached to the worn portion, and the like.

The device-wear detection portion 102 may generate, when device wear is detected, a log file (not shown) including time and the like. The portion 102 may then store the generated log file (not shown) in a storage portion 106 (described below). The device-wear detection portion 102 may typically detect the device wear. The portion 102 may store, when the device wear is detected and then not detected (when, for example, the user stops using the wearable device 100), the log file (not shown) in a storage portion 106 (described below).

The biometric-information authentication portion 104 acquires, when the device-wear detection portion 102 detects the device wear, biometric information from the user. The portion 104 then uses biometric information stored in the storage portion 106 (described below) to perform biometric authentication by, for example, a pattern matching. Examples of biometric information in accordance with an embodiment of the present invention includes physical information such as the user's vein pattern, iris, fingerprints, and face, and motion information such as a walking pattern. The head mount display in FIG. 1 and the wearable camera in FIG. 2 read the user's iris to perform the biometric authentication. The wrist-wearable device in FIG. 3 reads the vein pattern in the worn portion or in the vicinity thereof to perform the biometric authentication. It will be appreciated that biometric information in accordance with an embodiment of the present invention is not limited to the above information.

The biometric-information authentication portion 104 may perform, when the device-wear detection portion 102 detects no device wear, no authentication-related operations. When the device-wear detection portion 102 detects no device wear, i.e., the user does not wear the device, no authentication may be performed, thereby allowing the wearable device 100 to reduce unnecessary power consumption associated with authentication.

The biometric-information authentication portion 104 may also generate a log file (not shown) when the biometric authentication occurs. The log file includes information indicating that the biometric authentication has been performed, the biometric authentication results, the authentication time, and the like. The portion 104 may then store the generated log file (not shown) in the storage portion 106 (described below). The storage portion 106 storing the log file (not shown) may inform the user (including a specific user such as the owner of the wearable device 100) "which user" has used or tried to use the wearable device 100 at "what time."

The storage portion 106 is a storage means of the wearable device 100. The portion 106 may store various data such as profile data and content data. Non-limiting examples of the storage means of the storage portion 106 include a magnetic recording medium such as a hard disk drive (HDD); nonvolatile memories such as a random access memory (RAM), a read only memory (ROM), a magnetoresistive random access memory (MRAM), a ferroelectric random access memory (FeRAM), and a phase change random access memory (PRAM); optical recording media such as a recording digital versatile disk (DVD) and a recording compact disk (CD); and a magneto optical disk.

The profile data includes various settings such as settings of available functions of the wearable device 100 set for each user. The profile data is stored for each user. With reference to FIG. 4, for example, the storage portion 106 stores various profile data such as profile data A 112 and profile data B 114. The wearable device 100 may thus be used by a plurality of users.

[Profile Data in Accordance with an Embodiment of the Present Invention]

Figure 5:
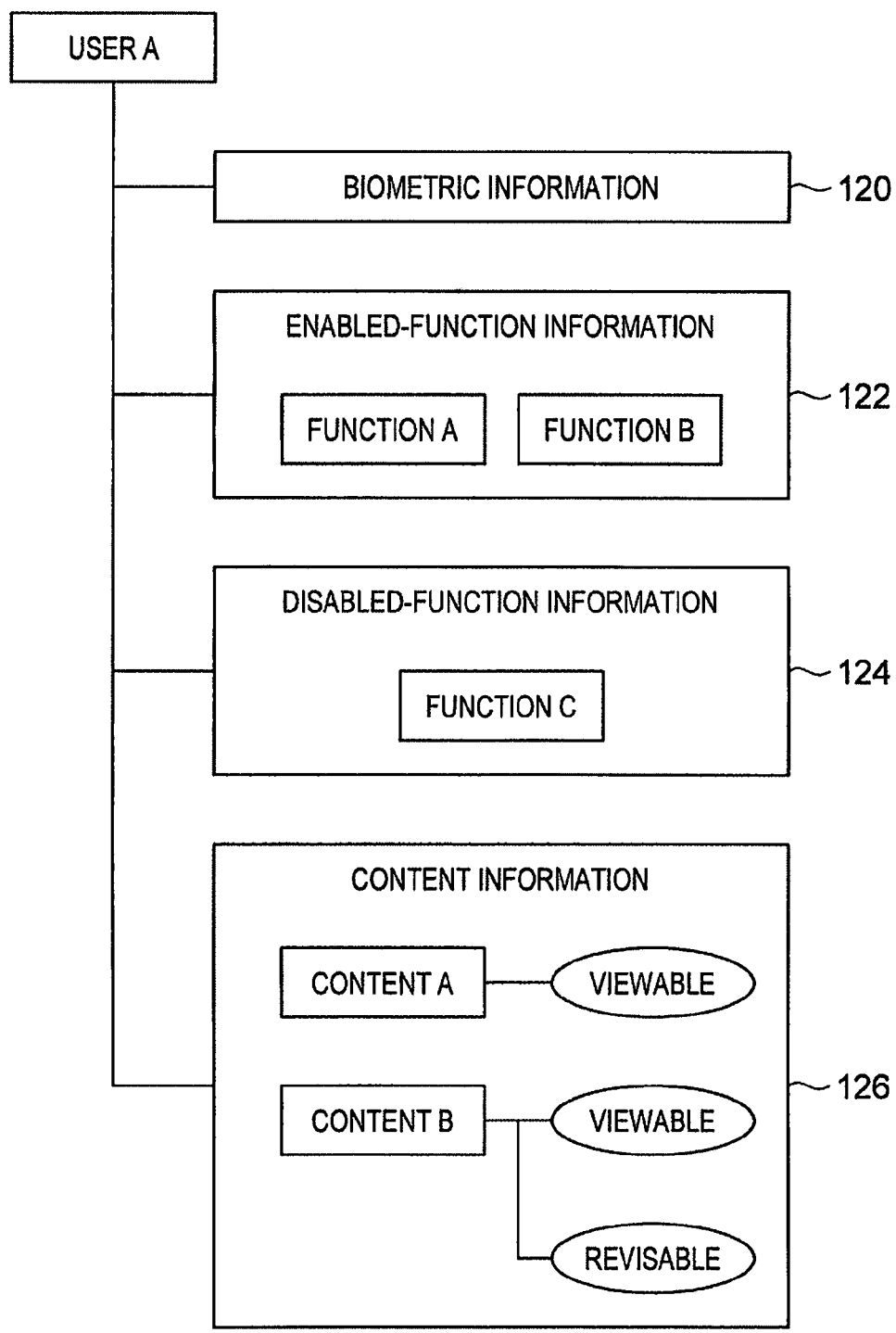
FIG. 5 schematically illustrates profile data in accordance with an embodiment of the present invention.

FIG. 5 schematically illustrates profile data in accordance with an embodiment of the present invention. FIG. 5 illustrates the profile data A 112 in FIG. 4. FIG. 5 only schematically shows example profile data in accordance with an embodiment of the present invention. Profile data in accordance with an embodiment of the present invention is not limited to the data in FIG. 5.

With reference to FIG. 5, the profile data A 112 in accordance with an embodiment of the present invention is data relating to a user A. The profile data A 112 includes biometric information 120, enabled-function information 122, disabled-function information 124, and content information 126.

The biometric information 120 is data used by the biometric-information authentication portion 104 for authentication. Examples of the biometric information 120 include user A's physical information such as a vein pattern, an iris, a fingerprint, and a face, and user A's motion information such as a walking pattern.

The enabled-function information 122 defines functions available to the user A among those of the wearable device 100. With reference to FIG. 5, for example, a function A and a function B are set as the available functions. Examples of the functions of the wearable device 100 include a content-data (described below) view/reproduction function, a content-data revision/edit function, a content-data delete function, a content-data copy function, a content-data generation function, and a content-data save function. It will be appreciated that the functions of the wearable device 100 are not limited to the content data-related functions. The enabled-function information 122 may not be set for each function in a way shown in FIG. 5. The information 122 may be information, for example, indicating "all function is available."

The disabled-function information 124 defines functions unavailable to the user A among those of the wearable device 100. With reference to FIG. 5, for example, a function C is set as the unavailable function.

The enabled-function information 122 and the disabled-function information 124 thus set may control the functions available for each user.

The content information 126 defines functions available to the user A among those of the wearable device 100. The information 126 defines the available functions for each content data (described below) stored in the storage portion 106. With reference to FIG. 5, for example, a content A (corresponding to the content data A 116) is set to be viewable, and the content data B (corresponding to the content data B 118) is set to be viewable and revisable. The user A may therefore revise the content B but not the content A.

The profile data as shown in FIG. 5 may be used for various settings such as settings of the functions available for each user. This allows the wearable device 100 to be shared by a plurality of users and control the functions and content data available for each user.

The profile data may be used to control the functions available for each user. This enables the power supply to be supplied to only the functions available to the user that actually uses the wearable device 100. The wearable device 100 may thus reduce the power consumption. It will be appreciated that when no profile data corresponds to the user that wishes to use the wearable device 100 (i.e., the user is not registered), turning on the main power supply (hereinafter, the main power supply refers to a power supply that is supplied to structural elements other than the biometric-information authentication portion 104) may even not be permitted.

Content data stored in the storage portion 106 is associated with contents available to the user. Non-limiting examples of content data include an audio file recorded in an audio format such as Moving Picture experts group phase-1 audio layer-3 (MP3) or Adaptive TRansform Acoustic Coding (ATRAC); a video file recorded in a video format such as Windows Media Video (WMV) or H.264/Moving Picture Experts Group phase-4 Advanced Video Coding (H.264/MPEG-4 AVC); a multimedia file such as an image file recorded in a still image format such as Joint Photographic Experts Group (JPEG); and a document file such as text data.

Although, in the profile data in FIG. 5, the profile data includes the content information 126, and the functions available to the user A are defined for each content data, the embodiments of the present invention are not limited thereto. Content data that defines the functions available to the user will be described below.

[Content Data in Accordance with an Embodiment of the Present Invention]

Figure 6A:
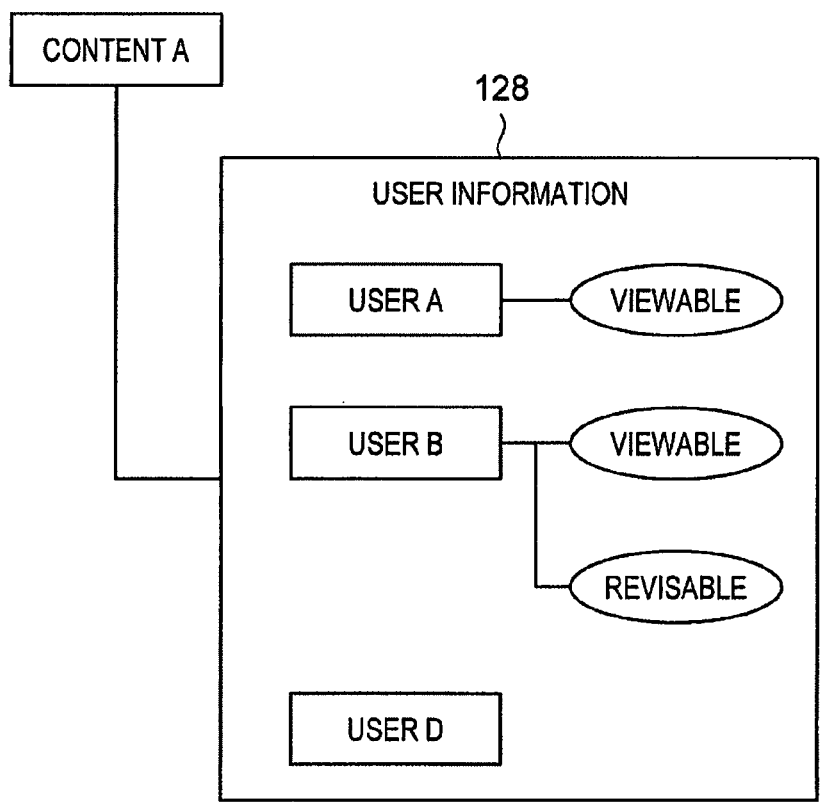
FIG. 6A schematically illustrates content data in accordance with an embodiment of the present invention.
Figure 6B:
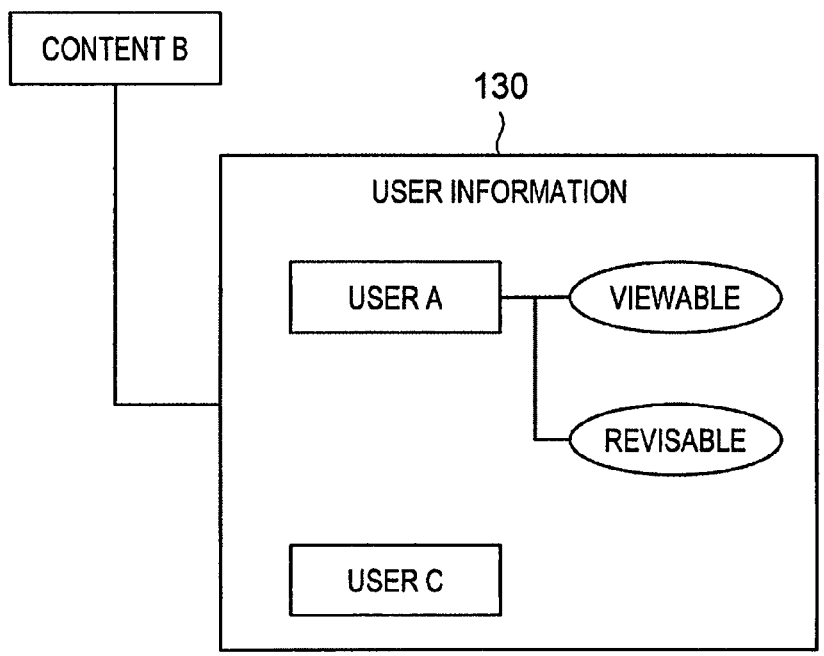
FIG. 6B schematically illustrates content data in accordance with an embodiment of the present invention.

FIGS. 6A and 6B schematically illustrate content data in accordance with an embodiment of the present invention. FIG. 6A shows the content data A 116 in FIG. 4. FIG. 6B shows the content data B 118 in FIG. 4. Note that FIGS. 6A and 6B only schematically show example content data in accordance with an embodiment of the present invention, and content data in accordance with an embodiment of the present invention is not limited to those in FIGS. 6A and 6B.

With reference to FIG. 6A, the content data A 116 in accordance with an embodiment of the present invention is data relating to the content A. The content data A 116 includes user information 128. The user information 128 sets different conditions for three users: the user A, a user B, and a user D. Specifically, the user information 128 sets information of "viewable" for the user A, information of "viewable" and "revisable" for the user B, and no condition for the user D. When, for example, the user A uses the content data A 116, the user A may only view the content data A 116. When the user B uses the content data A 116, the user B may view and copy the content data A 116. The user D may not view, copy, or delete the content data A 116. The user information 128 may also be set to hide the content data A 116 when the user D uses the wearable device 100.

With reference to FIG. 6B, the content data B 118 in accordance with an embodiment of the present invention is data relating to the content B. The content data B 118 includes user information 130 in a similar way to the content data A 116. The user information 130 sets different conditions for two users: the user A and a user C. Specifically, the user information 130 sets information of "viewable" and "revisable" for the user A and no condition for the user C. When, for example, the user A uses the content data B 118, the user A may view and revise the content data B 118. The user C with no information set therefor may not use the content data B 118 at all.

Content data as shown in FIGS. 6A and 6B may be used to set, for each set of content data, a user who is permitted to use the content data, and limit the functions available for each user. This allows the wearable device 100 to be shared by a plurality of users and control the functions and content data available for each user. Note that although the user information set in content data may be recorded as, for example, tag information of content data, the user information may also be embedded in content data as an electronic watermark. The user information may be added in content data when, for example, content data is generated using a wearable camera to capture an image. The user information may also be added or edited using the operation portion 110 (described below). With reference to FIGS. 6A and 6B, the user information sets a user who is forbidden to use content data (the user D in FIG. 6A and the user C in FIG. 6B). Alternatively, the user information may set only the available attribute and may not set the partially-available attribute. Conversely, the user information may set only the partially-available attribute.

Referring back to FIG. 4, the function portion 108 controls execution of the functions of the wearable device 100. Examples of the functions of the wearable device 100 include the content-data view/reproduction function, the content-data revision/edit function, the content-data delete function, and the content-data copy function. When, for example, content data is text data, the function portion 108 may have a text editor function. When, for example, content data is a multimedia file, the function portion 108 may have a video-edit function and a still-image edit function.

The operation portion 110 is a device operable by the user. A predetermined operation by the operation portion 110 may send, for example, the function portion 108 an instruction associated with the function execution. Non-limiting examples of the operation portion 110 include a button, a direction key, a rotation selector such as a jog dial, a voice command microphone, and a combination thereof.

The operation portion 110 may also be used as a device to edit the profile data. Non-limiting examples of the edit of the profile data include addition, revision, and deletion of a function from the enabled-function information and the disabled-function information. Allowing the operation portion 110 to be used to edit the profile data, the wearable device 100 may control the functions available for each user more flexibly.

Thus, the wearable device 100 in accordance with the first embodiment of the present invention has the above configuration and thus may detect the device worn by the user and perform the authentication according to whether the device is worn or not. The authentication is performed using the profile data set for each user. The profile data has various information set therein such as the functions available for each user. This allows the wearable device 100 to be shared by a plurality of users and control the functions and content data available for each user.

The wearable device 100 is a device that is to be used while being worn on the user's body. The wearable device 100 may thus easily acquire the biometric information from a portion in contact with or in the vicinity of the user's body. The wearable device 100 may therefore acquire the biometric information from the user for authentication without requesting the user to operate for the biometric authentication.

An authentication method in accordance with an embodiment of the present invention will now be described. Although the following authentication method is described as an authentication method for use in the wearable device 100 in accordance with the first embodiment of the present invention in FIG. 4, it will be appreciated that the authentication method in accordance with an embodiment of the present invention is not limited to use in the wearable device 100.

[First Authentication Method in Accordance with an Embodiment of the Present Invention]

Figure 7:
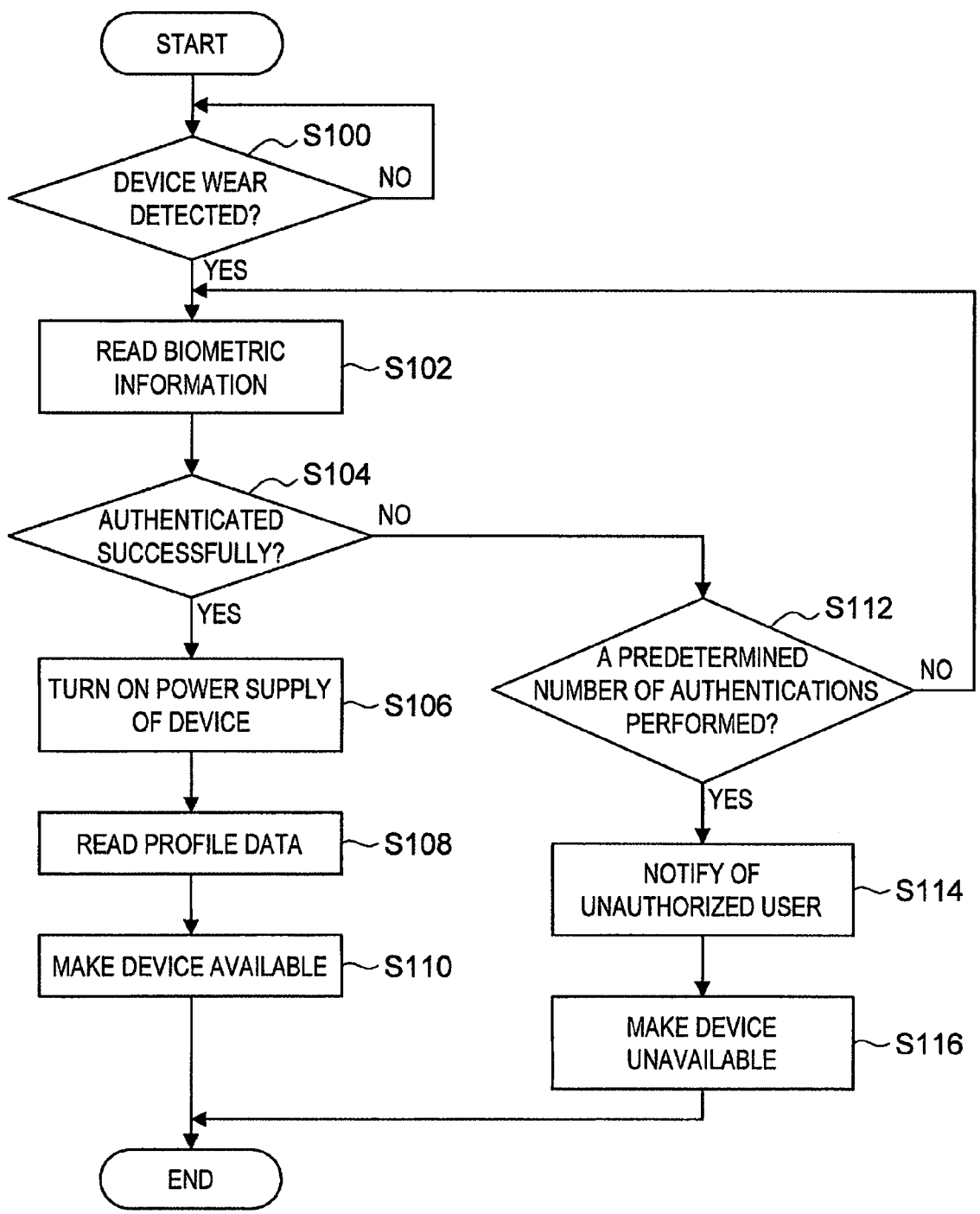
FIG. 7 is a flowchart of a first authentication method in accordance with an embodiment of the present invention.

FIG. 7 is a flowchart of a first authentication method in accordance with an embodiment of the present invention.

First, it is detected whether the wearable device 100 is worn or not (S100). At step S100, the device wear is detected by detecting, for example, a temperature change, a humidity change, an impedance change, or on/off of a switch attached to the worn portion.

If, at step S100, the device wear is not detected, the wearable device 100 does not operate at all until the device wear is detected. The wearable device 100 may thus control the power consumption.

If, at step S100, the device wear is detected, the wearable device 100 acquires and reads the biometric information from the user (S102). Non-limiting examples of the biometric information acquired from the user include physical information such as the user's vein pattern, iris, fingerprints, and face, and motion information such as a walking pattern. Note that the device wear is detected at step S100, and so it is less likely for the wearable device 100 to acquire no biometric information from the user. The wearable device 100 is a device that is to be used while being worn on the user's body. The wearable device 100 may thus easily acquire the biometric information from a portion in contact with or in the vicinity of the user's body.

The biometric information acquired from the user at step S102 is then used to perform the biometric authentication, and it is determined whether the authentication is successful or not (S104). At step S104, the biometric authentication may be performed as follows. The wearable device 100 first matches the biometric information acquired from the user at step S102 and the biometric information included in the profile data stored in the storage portion 106 of the wearable device 100. The device 100 then determines whether the two sets of biometric information correspond to each other or not. It will be appreciated that although at step S104, the authentication may be determined to be successful when "the biometric information acquired from the user at step S102 and the biometric information included in the profile data correspond to each other," the correspondence "may not be the perfect correspondence."

If, at step S104, the authentication fails, then it is determined whether a predetermined number of authentications has been performed or not (S112). At step S112, the determination is performed by comparing, for example, the number of authentications performed at step S112 and the predetermined number. The number of authentications performed at step S112 may be reset after a certain amount of time has passed since the last authentication. At step S112, the determination may be performed by, for example, the biometric-information authentication portion 104. Alternatively, the determination may be performed by a control portion (not shown) controlling the entire of the wearable device 100. Information associated with the predetermined number may be stored in the storage portion 106. Alternatively, the information may be stored in a storage means of the biometric-information authentication portion 104. Non-limiting examples of the storage means of the biometric-information authentication portion 104 include a magnetic recording medium such as a hard disk and a non-volatile memory such as a flash memory.

If, at step S112, it is determined that the predetermined number of authentications has not been performed, then the processes from step S102 are repeated. Even when, therefore, a mis-authentication occurs at step S104 (the mis-authentication refers here to the case where the profile data exists for the user (hereinafter referred to as the "registered user"), but his/her authentication fails), the authentication may be performed again, thereby increasing the possibility of the successful authentication.

If, at step S112, it is determined that the predetermined number of authentications has been performed, then the user is notified that he/she is an unauthorized user of the wearable device 100 (S114). The wearable device 100 is then made unavailable (S116). Non-limiting examples of the notification at step S114 include visual information presented on a display and audio information presented via a voice. At step S116, the wearable device 100 is made unavailable by, for example, not turning on the main power supply.

If, at step S104, the authentication is successful, the main power supply of the wearable device 100 is turned on (S106). The profile data is then read (S108). The profile data read at step S108 has various information set therein such as the enabled-function information, the disabled-function information, and the content information. These sets of information are used to allow the wearable device 100 to be used differently by each user (S110). It will be appreciated that when the profile data used in the biometric authentication at step S104 remains stored, step S108 is not always necessary.

In this way, the first authentication method in accordance with an embodiment of the present invention detects whether the device is worn or not, and performs the biometric authentication when the device wear is detected, and does not perform the biometric authentication when no device wear is detected. The wearable device 100 does not enable, therefore, the functions associated with the biometric authentication when no device wear is detected, and thus may suppress the power consumption associated with the biometric authentication.

The first authentication method may turn on, when the biometric authentication is successful, the main power supply of the wearable device 100. The first method may also make, when a predetermined number of biometric authentications has failed, the wearable device 100 unavailable. The wearable device 100 does not supply, therefore, when the biometric authentication fails, power supply for operating a function other than that associated with the biometric authentication. The wearable device 100 may thus suppress the power consumption.

The first authentication method may also make, only when the biometric authentication is successful, the wearable device 100 available. In other words, only the registered user may use the wearable device 100. It is thus possible to strictly control the user using the wearable device 100 and the available functions.

The wearable device 100 is a device that is to be used while being worn on the user's body. The wearable device 100 may thus easily acquire the biometric information from a portion in contact with or in the vicinity of the user's body. The first authentication method may therefore acquire the biometric information from the user for authentication without requesting the user to operate for the biometric authentication.

[Second Authentication Method in Accordance with an Embodiment of the Present Invention]

Figure 8:
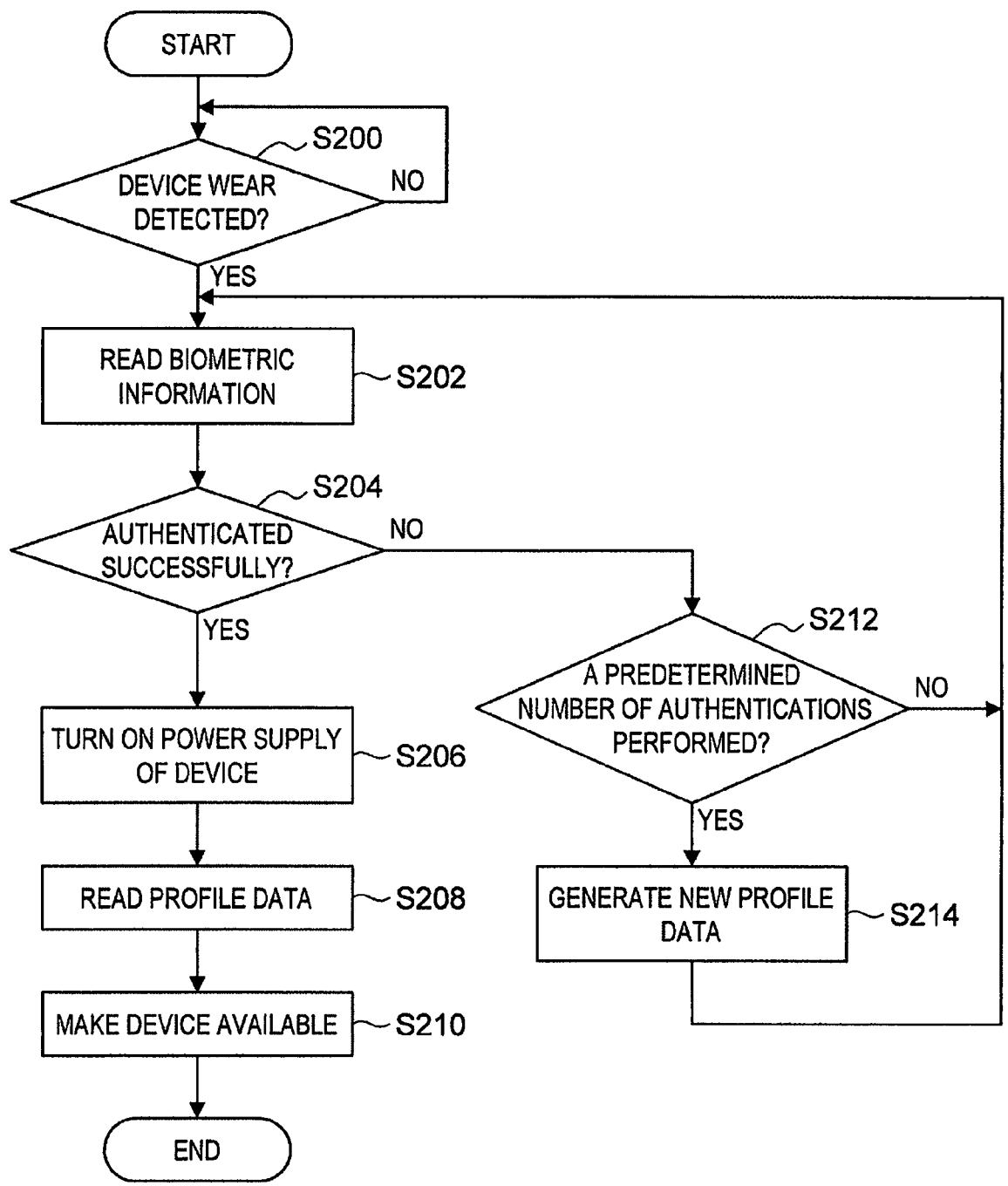
FIG. 8 is a flowchart of a second authentication method in accordance with an embodiment of the present invention.

In the first authentication method shown in FIG. 7, the wearable device 100 is made unavailable when the biometric authentication fails. However, the authentication method in accordance with an embodiment of the present invention is not limited to the method that makes the wearable device 100 unavailable when the biometric authentication fails. A second authentication method in accordance with an embodiment of the present invention will be described below. FIG. 8 is a flowchart of the second authentication method in accordance with an embodiment of the present invention.

First, as in the first authentication method, it is detected whether the wearable device 100 is worn or not (S200). If, at step S200, the device wear is not detected, the wearable device 100 does not operate at all until the device wear is detected. The wearable device 100 may thus suppress the power consumption.

If, at step S200, the device wear is detected, the wearable device 100 acquires and reads the biometric information from the user (S202), as in the first authentication method. The biometric information acquired from the user at step S202 is then used to perform the biometric authentication, and it is determined whether the authentication is successful or not (S204).

If, at step S204, the authentication fails, then it is determined whether a predetermined number of authentications has been performed or not (S112), as in the first authentication method. If, at step S212, it is determined that the predetermined number of authentications has not been performed, then the processes from step S202 are repeated.

If, at step S212, it is determined that the predetermined number of authentications has been performed, then new profile data is generated (S214). The processes from step S202 are then repeated. At step S214, the profile data may be generated by, for example, the biometric-information authentication portion 104. Alternatively, the profile data may be generated by a control portion (not shown) controlling the entire of the wearable device 100. The biometric information set in the generated profile data may be the biometric information acquired from the user. The enabled-function information, the disabled-function information, and the content information may be, for example, settings determined in advance. The information associated with settings determined in advance may be stored in the storage portion 106. Alternatively, the information may be stored in a storage means of the biometric-information authentication portion 104. The profile data generated at step S214 may be edited by, for example, the operation portion 110.

If, at step S204, the authentication is successful, the main power supply of the wearable device 100 is turned on (S206), as in the first authentication method. The profile data is then read (S208). The profile data read at step S208 has various information set therein such as the enabled-function information, the disabled-function information, and the content information. These sets of information are used to allow the wearable device 100 to be used differently by each user (S210).

In this way, the second authentication method in accordance with an embodiment of the present invention detects whether the device is worn or not, and performs the biometric authentication when the device wear is detected, and does not perform the biometric authentication when no device wear is detected. As in the first authentication method, therefore, the wearable device 100 does not enable, when no device wear is detected, the functions relating to the biometric authentication, and thus may suppress the power consumption associated with the biometric authentication.

The wearable device 100 is a device that is to be used while being worn on the user's body. The wearable device 100 may thus easily acquire the biometric information from a portion in contact with or in the vicinity of the user's body. The second authentication method may therefore acquire the biometric information from the user for authentication without requesting the user to operate for the biometric authentication.

The second authentication method turns on, when the biometric authentication is successful, the main power supply of the wearable device 100, and controls the functions according to the profile data. The second authentication method also generates, when a predetermined number of biometric authentications has failed, new profile data for authentication. The wearable device 100 may thus automatically increase the users who are permitted to use the device 100. In the wearable device 100, the enabled-function information, the disabled-function information, and the content information that are set in the generated profile data may be settings determined in advance to control the functions available for each user.

[Third Authentication Method in Accordance with an Embodiment of the Present Invention]

Figure 9:
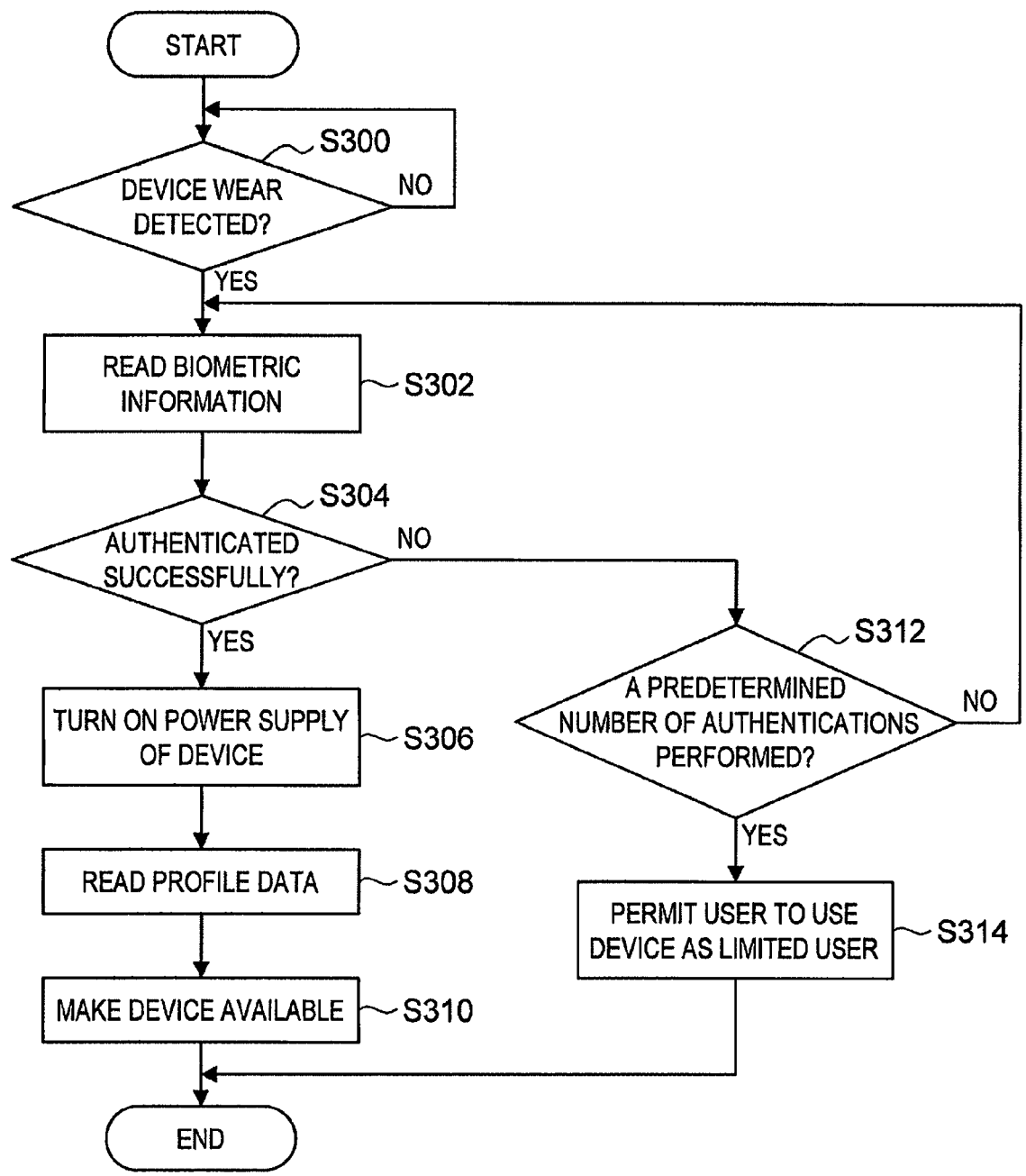
FIG. 9 is a flowchart of a third authentication method in accordance with an embodiment of the present invention.

In the first authentication method shown in FIG. 7, the wearable device 100 is made unavailable when the biometric authentication fails. In the second authentication method shown in FIG. 8, new profile data is generated when the biometric authentication fails, thereby automatically increasing the users who are permitted to use the device 100. However, the authentication method in accordance with an embodiment of the present invention is not limited to the first or second method. A third authentication method in accordance with an embodiment of the present invention will be described below. FIG. 9 is a flowchart of the third authentication method in accordance with an embodiment of the present invention.

First, as in the first authentication method, it is detected whether the wearable device 100 is worn or not (S300). If, at step S300, the device wear is not detected, the wearable device 100 does not operate at all until the device wear is detected. The wearable device 100 may thus suppress the power consumption.

If, at step S300, the device wear is detected, the wearable device 100 acquires and reads the biometric information from the user (S302), as in the first authentication method. The biometric information acquired from the user at step S302 is then used to perform the biometric authentication, and it is determined whether the authentication is successful or not (S304).

If, at step S304, the authentication fails, then it is determined whether a predetermined number of authentications has been performed or not (S312), as in the first authentication method. If, at step S312, it is determined that the predetermined number of authentications has not been performed, then the processes from step S302 are repeated.

If, at step S312, it is determined that the predetermined number of authentications has been performed, the user is permitted to use the wearable device 100 as a limited user (S314). The limited user refers to a user (i.e., a guest user) that is temporarily permitted to use the wearable device 100. When the wearable device 100 uses the third authentication method, the device 100 may store, for example, the profile data for the limited user in the storage portion 106, and read the profile data for the limited user from the storage portion 106. The profile data for the limited user is to be used for the temporary use of the wearable device 100. Edit of the profile data by the operation portion 110 may be made unavailable (the limited user may then use fixed functions).

If, at step S304, the authentication is successful, the main power supply of the wearable device 100 is turned on (S306), as in the first authentication method. The profile data is then read (S308). The profile data read at step S308 has various information set therein such as the enabled-function information, the disabled-function information, and the content information. These sets of information are used to allow the wearable device 100 to be used differently by each user (S310).

In this way, the third authentication method in accordance with an embodiment of the present invention detects whether the device is worn or not, and performs the biometric authentication when the device wear is detected, and does not perform the biometric authentication when no device wear is detected. As in the first authentication method, therefore, the wearable device 100 does not enable, when no device wear is detected, the functions relating to the biometric authentication, and thus may suppress the power consumption associated with the biometric authentication The wearable device 100 is a device that is to be used while being worn on the user's body. The wearable device 100 may thus easily acquire the biometric information from a portion in contact with or in the vicinity of the user's body. The third authentication method may therefore acquire the biometric information from the user for authentication without requesting the user to operate for the biometric authentication.

The third authentication method may turn on, when the biometric authentication is successful, the main power supply of the wearable device 100, and controls the functions according to the profile data. The third authentication method may temporarily permit, when the biometric authentication fails, the user to use the wearable device 100 as the guest user. When the third authentication method is applied to the wearable device 100, the device 100 may control, for the registered users, the functions available for each registered user and the like, and may control the limited user uniformly. The third authentication method may thus control the functions available for each user more flexibly.

The first to third authentication methods in accordance with an embodiment of the present invention shown in FIGS. 7 to 9 are associated with the authentication that is first performed when the user wears the wearable device 100. In the authentication method in accordance with an embodiment of the present invention, however, the authentication is not always performed when the user wears the wearable device 100. A description is now given of a fourth to a seventh authentication method in accordance with an embodiment of the present invention, the methods enabling the re-authentication of the user who is wearing (using) the wearable device 100. Note that the following fourth to seventh authentication methods are not such authentication methods that are performed once and end, but are repeated according to each processing condition.

[Fourth Authentication Method in Accordance with an Embodiment of the Present Invention]

Figure 10:
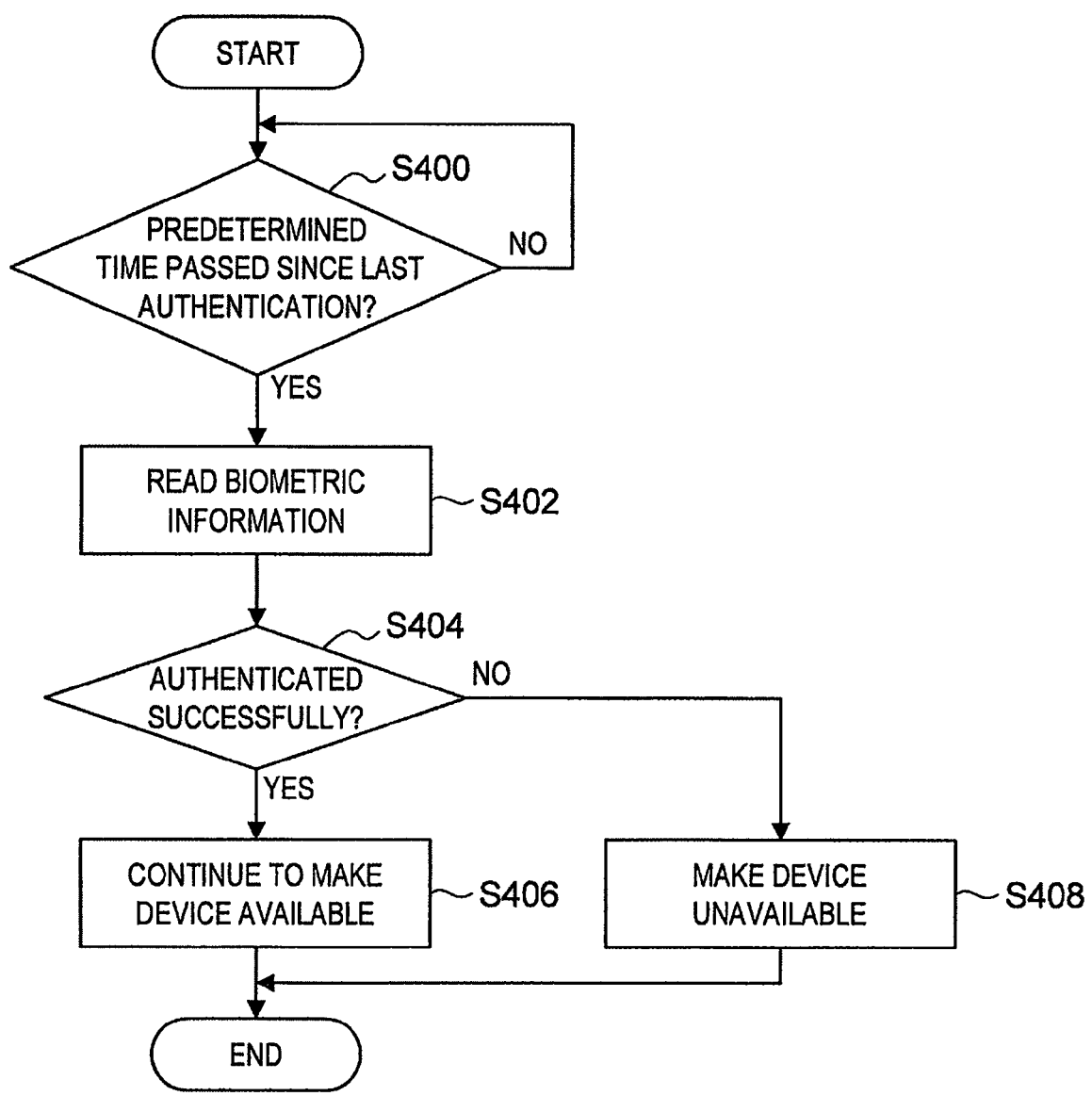
FIG. 10 is a flowchart of a fourth authentication method in accordance with an embodiment of the present invention.

FIG. 10 is a flowchart of a fourth authentication method in accordance with an embodiment of the present invention.

First, it is determined whether or not a predetermined amount of time has passed since the last authentication (S400). At step S400, the determination may be performed as follows, for example. For each authentication, the authentication time is overwritten and stored in a storage means of the biometric-information authentication portion 104, and then the authentication time plus a predetermined amount of time is compared with the time of the determination. Information associated with the predetermined amount of time may be stored in the storage portion 106. Alternatively, the information may be stored in the storage means of the biometric-information authentication portion 104. The predetermined amount of time may be measured by, for example, a clock-generation means such as quartz and a counting means for counting the clock, both means belonging to the biometric-information authentication portion 104. At step S400, the determination may not be performed by the biometric-information authentication portion 104. Alternatively, the determination may be performed by, for example, a control portion (not shown) controlling the entire of the wearable device 100.

If, at step S400, a predetermined amount of time has not passed yet, then the wearable device 100 does not perform an operation associated with the authentication until the predetermined amount of time has passed.

If, at step S400, the predetermined amount of time has passed, then the wearable device 100 acquires and reads the biometric information from the user (S402), as in the first authentication method. The biometric information acquired from the user at step S402 is then used to perform the biometric authentication, and it is determined whether the authentication is successful or not (S404).

If, at step S404, it is determined that the authentication fails, then the wearable device 100 is made unavailable (S408), as in the first authentication method. Although not shown in FIG. 10, before step S408, a predetermined number of authentications may be performed, for example, as in the first to third authentication methods shown in FIGS. 7 to 9. Alternatively, the user may be notified that he/she is an unauthorized user of the wearable device 100, as in the first authentication method shown in FIG. 7.

If, at step S404, the authentication is successful, the user using the wearable device 100 may continue to use the wearable device 100 according to the profile data corresponding to the user (S406).

In this way, the four authentication method in accordance with an embodiment of the present invention regularly authenticates the user using the wearable device 100. If the regular authentication fails, the wearable device 100 may be made unavailable. The fourth authentication method may thus provide the following advantages. The wearable device 100 may strictly control the user using the wearable device 100 and the functions available to the user, even when the user represented by the profile data and the user using the wearable device 100 are different. The difference occurs (1) when, for example, after the registered user is authenticated, the registered user is replaced with an unregistered user, or (2) when an unauthorized user intending to use the wearable device 100 successfully passes the authentication when the unauthorized user wears the wearable device 100.

The wearable device 100 is a device that is to be used while being worn on the user's body. The wearable device 100 may thus easily acquire the biometric information from a portion in contact with or in the vicinity of the user's body. The fourth authentication method may therefore acquire the biometric information from the user for authentication without requesting the user to operate for the biometric authentication.

[Fifth Authentication Method in Accordance with an Embodiment of the Present Invention]

Figure 11:
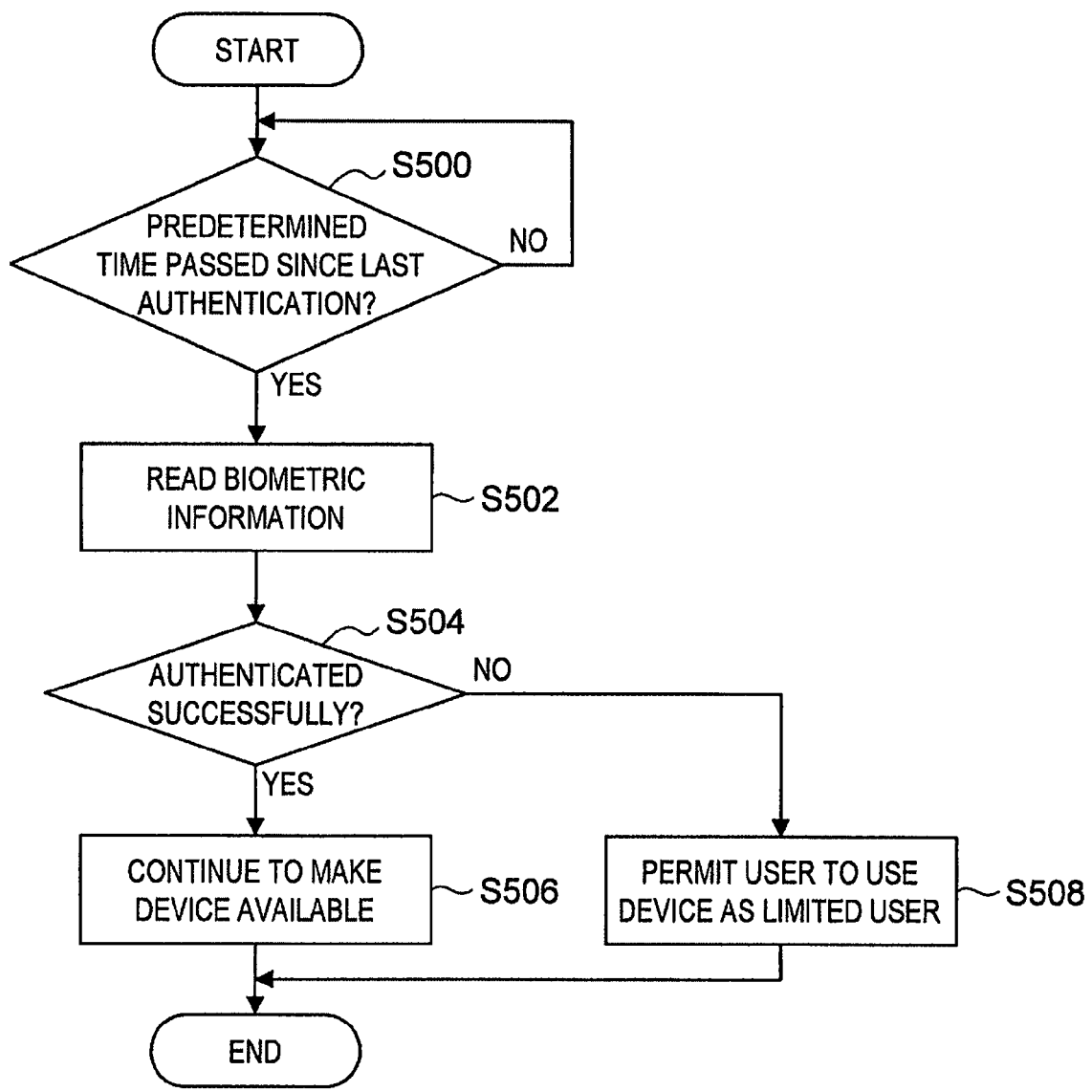
FIG. 11 is a flowchart of a fifth authentication method in accordance with an embodiment of the present invention.

In the fourth authentication method shown in FIG. 10, the wearable device 100 is made unavailable when the biometric authentication fails. However, the authentication method in accordance with an embodiment of the present invention that may authenticate the user who is wearing (using) the wearable device 100 is not limited to the method that makes the wearable device 100 unavailable when the biometric authentication fails. A fifth authentication method in accordance with an embodiment of the present invention will now be described below. FIG. 11 is a flowchart of the fifth authentication method in accordance with an embodiment of the present invention.

First, as in the fourth authentication method, it is determined whether or not a predetermined amount of time has passed since the last authentication (S500). If, at step S500, it is determined that a predetermined amount of time has not passed yet, then the wearable device 100 does not perform an operation associated with the authentication until the predetermined amount of time has passed.

If, at step S500, the predetermined amount of time has passed, then the wearable device 100 acquires and reads the biometric information from the user (S502), as in the fourth authentication method. The biometric information acquired from the user at step S502 is then used to perform the biometric authentication, and it is determined whether the authentication is successful or not (S504).

If, at step S504, it is determined that the authentication fails, then the user using the wearable device 100 is changed to a limited user, and the user is permitted to use the wearable device 100 as the limited user (S508), as in the third authentication method. Before step S508, although not shown in FIG. 11, a predetermined number of authentications may be performed, for example, as in the first to third authentication methods shown in FIGS. 7 to 9.

If, at step S504, the authentication is successful, the user using the wearable device 100 may continue to use the wearable device 100 according to the profile data corresponding to the user (S506), as in the fourth authentication method.

In this way, the fifth authentication method in accordance with an embodiment of the present invention regularly authenticates the user using the wearable device 100, and when the authentication fails, changes the user to the limited user. The fifth authentication method may thus provide the following advantages. The wearable device 100 may control the functions available to the user using the wearable device 100 even when the user represented by the profile data and the user using the wearable device 100 are different.

The wearable device 100 is a device that is to be used while being worn on the user's body. The wearable device 100 may thus easily acquire the biometric information from a portion in contact with or in the vicinity of the user's body. The fifth authentication method may therefore acquire the biometric information from the user for authentication without requesting the user to operate for the biometric authentication.

[Sixth Authentication Method in Accordance with an Embodiment of the Present Invention]

Figure 12:
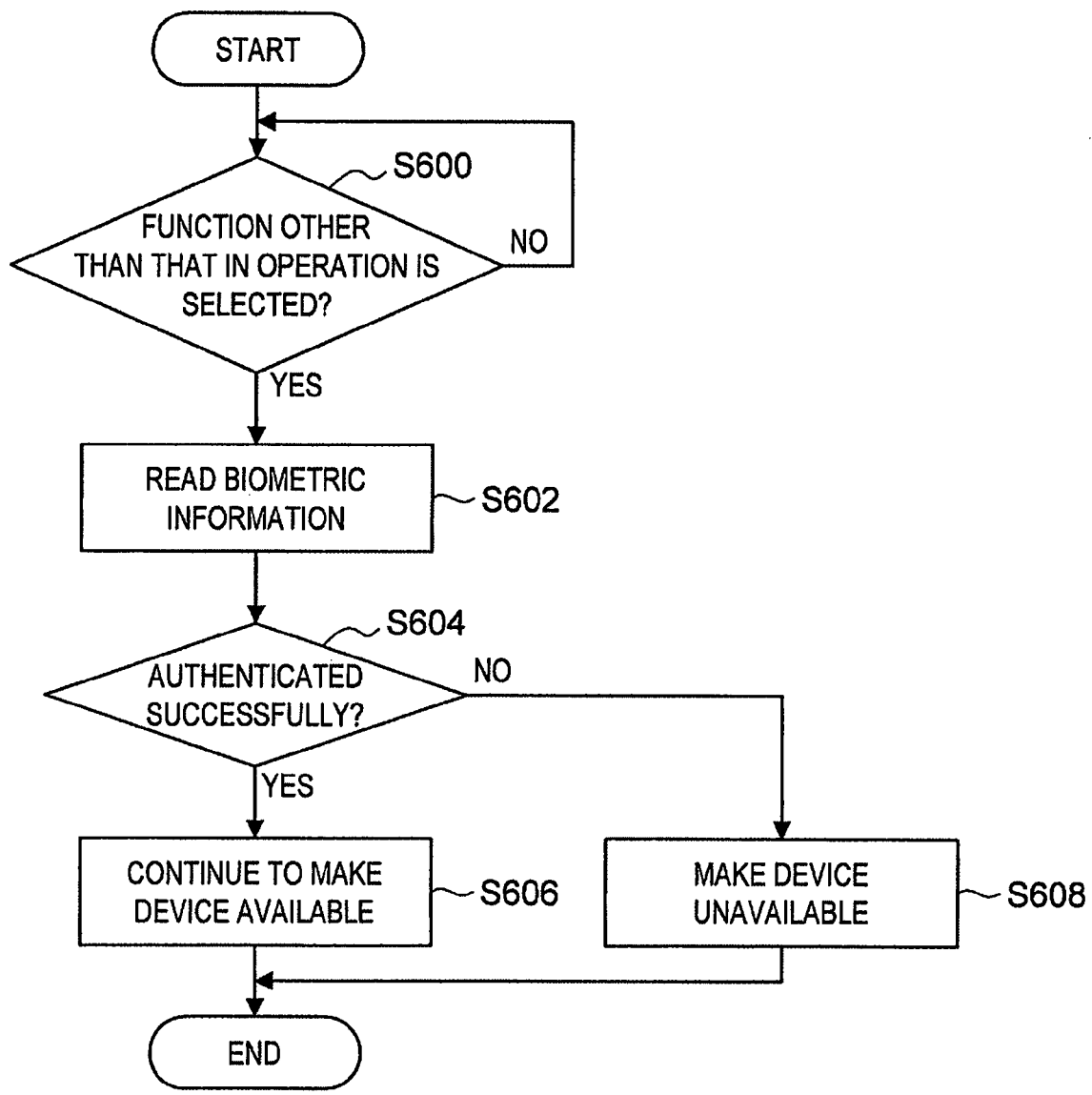
FIG. 12 is a flowchart of a sixth authentication method in accordance with an embodiment of the present invention.

In the fourth and fifth authentication methods shown in FIGS. 10 and 11, the user using the wearable device 100 is regularly authenticated. However, the authentication method in accordance with an embodiment of the present invention that may authenticate the user who is wearing the wearable device 100 is not limited to the method that regularly authenticates the user. A sixth authentication method in accordance with an embodiment of the present invention will now be described below. FIG. 12 is a flowchart of the sixth authentication method in accordance with an embodiment of the present invention.

First, it is determined whether or not a function other than that in operation is selected (S600). Non-limiting examples of the function in operation include the content-data view/reproduction function, edit function, copy function, and delete function. The function in operation may include the case where no special function is in operation, i.e., the wearable device 100 is on standby.

At step S600, the determination may be triggered, for example, by the operation of the operation portion 110, or performed by the function portion 108 having various sensors such as a force sensor, an acceleration sensor, an angular velocity sensor, an optical sensor, and a magnetic sensor, these sensors detecting various physical quantities. At step S600, therefore, "a function other than that in operation is selected" may be replaced with, for example, "an operation in the operation portion 110 other than that in operation is performed."

If, at step S600, it is not determined that other function is selected, then the wearable device 100 does not perform an operation associated with the authentication until it is determined that other function is selected.

If, at step S600, it is determined that other function is selected, then the wearable device 100 acquires and reads the biometric information from the user (S602), as in the fourth authentication method. The biometric information acquired from the user at step S602 is then used to perform the biometric authentication, and it is determined whether the authentication is successful or not (S604).

If, at step S604, it is determined that the authentication fails, then the wearable device 100 is made unavailable (S608), as in the fourth authentication method. Before step S608, although not shown in FIG. 12, a predetermined number of authentications may be performed, for example, as in the first to third authentication methods shown in FIGS. 7 to 9. Alternatively, the user may be notified that he/she is an unauthorized user of the wearable device 100, as in the first authentication method shown in FIG. 7.

If, at step S604, the authentication is successful, the user using the wearable device 100 may continue to use the wearable device 100 according to the profile data corresponding to the user (S606), as in the fourth authentication method.

In this way, the sixth authentication method in accordance with an embodiment of the present invention authenticates the user using the wearable device 100 when, for example, the user operates the operation portion 110. If, for example, the authentication fails when the user operates the operation portion 110, the wearable device 100 may be made unavailable. The six authentication method may thus provide the following advantages. The wearable device 100 may strictly control the user using the wearable device 100 and the functions available to the user even when the user represented by the profile data and the user using the wearable device 100 are different.

The wearable device 100 is a device that is to be used while being worn on the user's body. The wearable device 100 may thus easily acquire the biometric information from a portion in contact with or in the vicinity of the user's body. The sixth authentication method may therefore acquire the biometric information from the user for authentication without requesting the user to operate for the biometric authentication.

[Seventh Authentication Method in Accordance with an Embodiment of the Present Invention]

Figure 13:
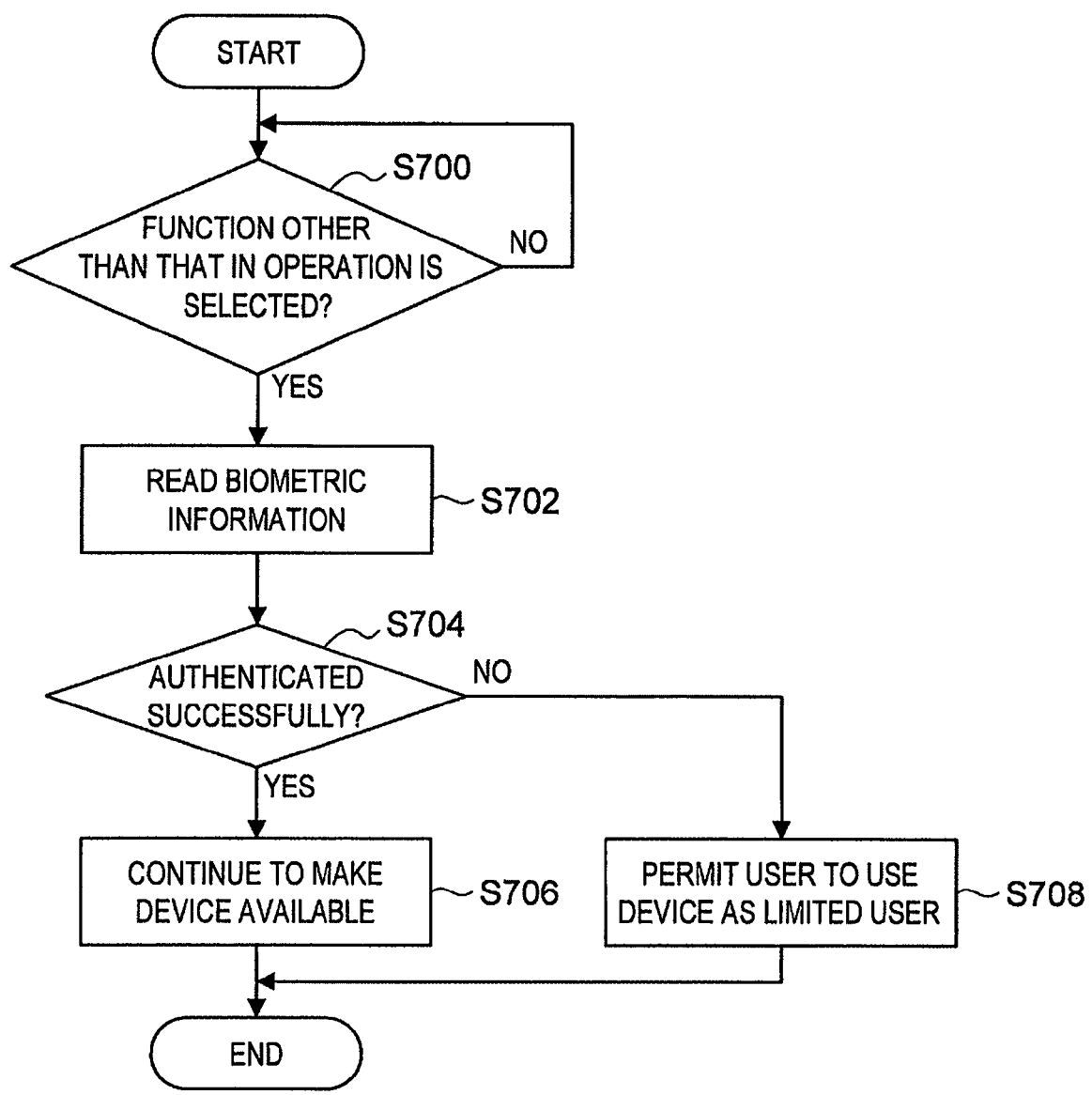
FIG. 13 is a flowchart of a seventh authentication method in accordance with an embodiment of the present invention.

In the sixth authentication method shown in FIG. 12, the wearable device 100 is made unavailable when the biometric authentication fails, as in the fourth authentication method. As shown in the fifth authentication method, however, the authentication method in accordance with an embodiment of the present invention that may authenticate the user who is wearing the wearable device 100 is not limited to the method that makes the wearable device 100 unavailable when the biometric authentication fails. A seventh authentication method in accordance with an embodiment of the present invention will now be described below. FIG. 13 is a flowchart of the seventh authentication method in accordance with an embodiment of the present invention.

First, as in the sixth authentication method, it is determined whether or not a function than other that in operation is selected (S700). If, at step S700, it is not determined that other function is selected, then the wearable device 100 does not perform an operation associated with the authentication until it is determined that other function is selected. Note that at step S700, therefore, "a function other than that in operation is selected" may be replaced with, for example, "an operation in the operation portion 110 other than that in operation is performed."

If, at step S700, it is determined that other function is selected, then the wearable device 100 acquires and reads the biometric information from the user (S702), as in the six authentication method. The biometric information acquired from the user at step S702 is then used to perform the biometric authentication, and it is determined whether the authentication is successful or not (S704).

If, at step S704, it is determined that the authentication fails, then the user using the wearable device 100 is changed to a limited user, and the user is permitted to use the wearable device 100 as the limited user (S708), as in the third authentication method. Before step S708, although not shown in FIG. 13, a predetermined number of authentications may be performed, for example, as in the first to third authentication methods shown in FIGS. 7 to 9.

If, at step S704, the authentication is successful, the user using the wearable device 100 may continue to use the wearable device 100 according to the profile data corresponding to the user (S706), as in the fourth authentication method.

In this way, the seventh authentication method in accordance with an embodiment of the present invention authenticates the user using the wearable device 100 when, for example, the user operates the operation portion 110. If, for example, the authentication fails when the user operates the operation portion 110, the user is changed to the limited user. The seventh authentication method may thus provide the following advantages. The wearable device 100 may control the functions available to the user using the wearable device 100 even when the user represented by the profile data and the user using the wearable device 100 are different.

The wearable device 100 is a device that is to be used while being worn on the user's body. The wearable device 100 may thus easily acquire the biometric information from a portion in contact with or in the vicinity of the user's body. The seventh authentication method may therefore acquire the biometric information from the user for authentication without requesting the user to operate for the biometric authentication.

In this way, the wearable device 100 in accordance with the first embodiment of the present invention may detect whether the device is worn or not, and perform the biometric authentication when the device wear is detected, and not perform the biometric authentication when no device wear is detected. The wearable device 100 does not enable, therefore, when no device wear is detected, the functions relating to the biometric authentication, and thus may suppress the power consumption associated with the biometric authentication.

The wearable device 100 may perform the biometric authentication using profile data having functions available for each user and the like set therein. The wearable device 100 may thus be shared by a plurality of users.

When the biometric authentication fails, the wearable device 100 may disable or limit the functions. The wearable device 100 may thus control, for each user, the power consumption, the available functions, and the available content data.

The wearable device 100 may authenticate the user who wears the wearable device 100, and also the user who is wearing (using) the wearable device 100. The wearable device 100 may thus control the functions available to the user using the wearable device 100 and the like even when the user represented by the profile data and the user using the wearable device 100 are different.

The wearable device 100 is a device that is to be used while being worn on the user's body. The wearable device 100 may thus easily acquire the biometric information from a portion in contact with or in the vicinity of the user's body. The wearable device 100 may therefore acquire the biometric information from the user for authentication without requesting the user to operate for the biometric authentication. The user may thus be released from the inconvenience associated with the authentication.

(Program According to First to Third Authentication Methods)

A recording medium recording a program for allowing the wearable device to function as a computer may be loaded into the wearable device and the program may be run, thereby allowing the wearable device to acquire the biometric information from the user who wears the wearable device for authentication without requesting the user to operate for the biometric authentication.

(Program According to Fourth to Seventh Authentication Methods)

A recording medium recording a program for allowing the wearable device to function as a computer may be loaded into the wearable device and the program may be run, thereby allowing the wearable device to authenticate the user who is wearing (using) the wearable device, and also acquire the biometric information from the user for authentication without requesting the user to operate for the biometric authentication.

(Second Embodiment)

The wearable device 100 in accordance with the first embodiment of the present invention includes a wearable device that functions alone, i.e., functions as a stand-alone device. However, the wearable device in accordance with an embodiment of the present invention is not limited to the stand-alone device. A description is now given of a wearable device in accordance with a second embodiment of the present invention, the wearable device being able to communicate with an external device.

Figure 14:
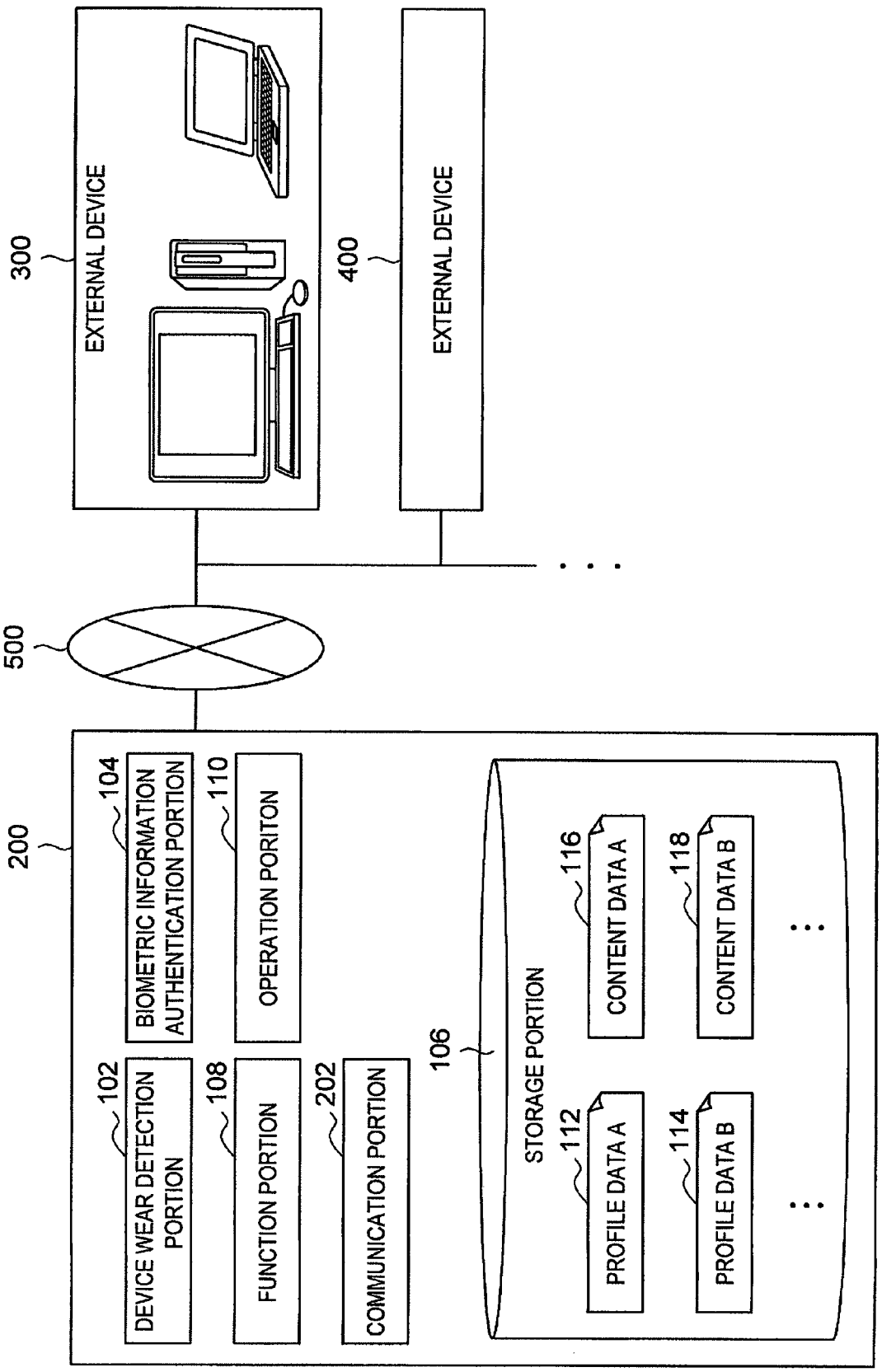
FIG. 14 is a block diagram of a communication system including a wearable device in accordance with a second embodiment of the present invention.

FIG. 14 is a block diagram of a communication system including a wearable device 200 in accordance with the second embodiment of the present invention.

With reference to FIG. 14, the communication system in accordance with an embodiment of the present invention includes the wearable device 200 and external devices such as devices 300 and 400. The wearable device 200 and the external devices 300 and 400 are connected via a network line 500. Non-limiting examples of the network line 500 include wired networks such as a Local Area Network (LAN) and a Wide Area Network (WAN); a wireless network such as a Wireless Local Area Network (WLAN) using an Multiple-Input Multiple-Output (MIMO); and the Internet using a communication protocol such as a Transmission Control Protocol/Internet Protocol (TCP/IP).

The wearable device 200 is basically configured in a similar way to the wearable device 100 in accordance with the first embodiment of the present invention. Compared to the wearable device 100, the wearable device 200 includes an additional communication portion 202. The wearable device 200 may thus authenticate the user in a similar way to the wearable device 100. The communication function of the wearable device 200 will now be described below.

The communication portion 202 has a function of communicating, via the network line 500, with an external device. The communication portion 202 may transmit and receive data between the wearable device 200 and the external device.

The wearable device 200 may be connected to a specific external device by, for example, referring to communication information included in the profile data stored in the storage portion 106. The communication information defines the connection destination such as the Internet Protocol (IP) Address. The communication information may include data, such as "ID" or "path word", that is used in the external device to identify the user. The wearable device 200 may store the profile data for each user, as in the wearable device 100 in accordance with the first embodiment. The wearable device 200 may thus use the communication information set for each user to connect to different external devices for each user. In this way, the wearable device 200 may connect to the external device, so the communication system in accordance with an embodiment of the present invention may provide the following advantages, for example.

[First Application: Saving Log in External Device] The wearable device 200 may generate a log file when the biometric authentication occurs, as in the wearable device 100 in accordance with the first embodiment. The log file includes information indicating that the biometric authentication has been performed, the biometric authentication results, the authentication time, and the like. The generated log file may be stored in the storage portion 106 and may also be sent to the external device where the log file is stored. This configuration may make, for example, the connection destination included in the connection information of the profile data the same for all registered users (including the limited user), thereby allowing a management device such as a server to monitor the wearable device 200 and thus discover the unauthorized use of the wearable device 200.

[Second Application: Switching Subscription Service for Each User]

The wearable device 200 may include, in the communication information of the profile data, information such as "connection destination," and "ID" and "path word" for using services and thus may switch a subscription service such as subscription of the magazine data for each user, for example. The service provider may thus provide, via the wearable device 200, a variety of services to each user.

[Third Application: Sharing of Content Data]

In addition, the wearable device 200 may share content data of the wearable device 200 and/or content data of the external device between the wearable device 200 and the external device. This configuration may allow a plurality of users to work together to generate documents or program codes using a plurality of devices, and also allow synchronization of content data between the wearable device 200 and the external device.

It will be appreciated that the first to third applications are only examples of the communication system in accordance with an embodiment of the present invention, and the communication system in accordance with an embodiment of the present invention is not limited thereto.

In this way, the wearable device 200 in accordance with the second embodiment of the present invention is basically configured in a similar way to the wearable device 100 in accordance with the first embodiment of the present invention. The wearable device 200 may detect whether the device is worn or not, and perform the biometric authentication when the device wear is detected, and not perform the biometric authentication when no device wear is detected. The wearable device 200 does not enable, therefore, when no device wear is detected, the functions relating to the biometric authentication, and thus may suppress the power consumption associated with the biometric authentication.

The wearable device 200 may perform, as in the wearable device 100 in accordance with the first embodiment, the biometric authentication using profile data having functions available for each user and the like set therein. The wearable device 200 may thus be shared by a plurality of users.

Also as in the wearable device 100 in accordance with the first embodiment, when the biometric authentication fails, the wearable device 200 may disable or limit the functions. The wearable device 200 may thus control, for each user, the power consumption, the functions available to the user, and content data available to the user.

Also as in the wearable device 100 in accordance with the first embodiment, the wearable device 200 may authenticate the user who wears the wearable device 200, and also the user who is wearing (using) the wearable device 200. The wearable device 200 may thus control the functions available to the user using the wearable device 200 and the like even when the user represented by the profile data and the user using the wearable device 200 are different.

The wearable device 200 is a device that is to be worn and used by the user. The wearable device 200 may thus easily acquire the biometric information from a portion in contact with the user or a portion in the vicinity of the user. The wearable device 200 may therefore acquire the biometric information from the user for authentication without requesting the user to operate for the biometric authentication. The user may thus be released from the inconvenience associated with the authentication.

The wearable device 200 may communication with an external device. The device may thus have various functions, such as saving a log in the external device, switching the subscription service, and sharing content data, that are possible in cooperation with the external device.

Although in FIG. 14, the communication system in accordance with an embodiment of the present invention includes the external devices 300 and 400 as the structural elements, the embodiments of the present invention are not limited thereto. The communication system in accordance with an embodiment of the present invention may be applied to other devices such as computers such as a personal computer (PC) and a server, portable communication devices such as a mobile phone and a personal handy-phone system (PHS), and wearable devices such as a head-mount display and a wearable camera.

It should be understood by those skilled in the art that various modifications, combinations, sub-combinations, and alterations may occur depending on design requirements and other factors insofar as they are within the scope of the appended claims or the equivalents thereof.

Although the wearable devices shown in FIGS. 4 and 14 include, for example, the biometric-information authentication portion and the function portion as separate portions, the biometric-information authentication portion and the function portion may be integrated into a single structural element.

Although the wearable devices shown in FIGS. 4 and 14 each include a specific storage portion therein, the storage portion may be removable from the wearable device and the user may exchange the storage portion as desired.

The above configurations show example embodiments of the present invention, and are of course within the scope of the present invention.

What is claimed is:

1. A wearable device configured to be used while being worn on a body of a current user, the wearable device comprising:
    a storage device configured:
        to store first profile data for a first existing user comprising first biometric information for the first existing user and first function information for enabling a supply of power to a first subset of a plurality of functions available on the wearable device and for disabling a supply of power to a remainder of the plurality of functions for the first existing user, and second profile data for a second existing user comprising second biometric information for the second existing user and second function information for enabling a supply of power to a second subset of the plurality of functions and for disabling a supply of power to a remainder of the plurality of functions for the second existing user, the second subset of the plurality of functions being different than the first subset of the plurality of functions; and to store default function information for enabling a supply of power to a third subset of the plurality of functions and for disabling a supply of power to a remainder of the plurality of functions, wherein the third subset of the plurality of functions is different than each of the first subset of the plurality of functions and the second subset of the plurality of functions, and wherein the default function information is added to a new user profile when the new user profile is created;

a biometric-information authentication portion configured:

to acquire the biometric information from the current user and perform biometric authentication according to the biometric information acquired from the body of the current user and the first profile data and the second profile data stored in the storage device;

if during the biometric authentication the biometric information acquired from the current user matches the biometric information for a matching user of the first and second existing users stored in the storage device, to identify the current user as the matching user; and if during the biometric authentication the biometric information acquired from the current user does not match the biometric information of either of the first and second existing users stored in the storage device, to add new profile data for the current user to the storage device by storing the biometric information acquired from the body of the current user and function information for enabling or disabling the supply of power to each of the plurality of functions for the current user, wherein the added function information is the default functions information; and a function portion configured to control execution of the plurality of functions using the function information of the profile data to determine whether the supply of power to each of the plurality of functions is to be enabled or disabled for the current user.

2. The wearable device according to claim 1, further comprising a device-wear detection portion configured to detect whether the wearable device is worn or not, and wherein the biometric-information authentication portion is further configured:

to perform the biometric authentication when the device-wear detection portion detects the wearable device is worn; and to perform no biometric authentication when the device-wear detection portion detects the wearable device is not worn.

3. The wearable device according to claim 1, wherein:

the biometric authentication portion is further configured to perform the biometric authentication again after a predetermined amount of time has passed since the biometric-information authentication portion last performed biometric authentication of the current user.

4. The wearable device according to claim 1, further comprising:

an operation portion configured to perform an operation to the function portion; and wherein:

the biometric-information authentication portion is further configured to perform the biometric authentication when the operation portion performs the operation.

5. The wearable device according to claim 4, wherein the operation portion is selected from the group consisting of a button, a direction key, a rotation sensor, and a microphone.

6. The wearable device according to claim 1, wherein:

the storage device is further configured to store a plurality of sets of content data performed by the function portion and associated with the plurality of functions;

the profile data further comprises content-data authority information associated with execution of the content data; and the function portion is configured to use the content-data authority information to enable or disable the plurality of functions for each set of content data and for each function.

7. The wearable device according to claim 1, wherein:

the storage device is further configured to store a plurality of sets of content data performed by the function portion;

each set of content data includes user information that defines which of the first and second existing users is performed to use the content data; and the function portion is further configured to enable or disable the plurality of functions for each set of content data and for each information according to the profile data and the user information.

8. The wearable device according to claim 1, further comprising:

a communication portion configured to communicate with at least one external device; and wherein:

the profile data further comprises communication information that defines a particular external device for communication; and the communication portion is further configured to communicate with the particular external device according to the communication information of the profile data.

9. The wearable device according to claim 8, wherein:

the communication portion is further configured such that, when the biometric-information authentication portion performs the biometric authentication, the communication portion communicates with the particular external device to notify the particular external device of the biometric authentication that has been performed.

10. The wearable device according to claim 1, wherein the biometric information for the current user is selected from the group consisting of a vein pattern, a fingerprint and a walking pattern.

11. The wearable device according to claim 1, wherein the function portion is configured such that, if the biometric-information authentication portion determines that the current user is not authorized, the function portion allows the current user limited access to one or more of the plurality of functions.

12. An authentication method in a wearable device, the wearable device being used while being worn on a body of a current user, the method comprising acts of:

storing first and second profile data on a storage device, the first profile data comprising first biometric information for a first existing user and first function information for enabling a supply of power to a first subset of a plurality of functions available on the device and for disabling a supply of power to a remainder of the plurality of functions for the first existing user, and the second profile data comprising second biometric information for a second existing user and second function information for enabling a supply of power to a second subset of the plurality of functions and for disabling a supply of power to a remainder of the plurality of functions for the second existing user, the second subset of the plurality of functions being different than the first subset of the plurality of functions; and storing default function information for enabling a supply of power to a third subset of the plurality of functions and for disabling a supply of power to a remainder of the plurality of functions, wherein the third subset of the plurality of functions is different than each of the first subset of the plurality of functions and the second subset of the plurality of functions, and wherein the default function information is added to a new user profile when the new user profile is created;

detecting whether the wearable device is worn or not;

acquiring biometric information from the current user for biometric authentication when the wearable device is detected as being worn, and acquiring no biometric information from the user when the wearable device is detected as not being worn;

comparing the biometric information acquired from the current user with the biometric data for the first and second existing users;

if the biometric information acquired from the current user matches the biometric data for a matching user of the first and second existing users, then identifying the current user as the matching user;

if the biometric information acquired from the current user does not match the biometric data for the first or second existing users, storing new profile data for the current user on the storage device, the new profile data comprising the biometric information acquired from the current user and function information for enabling or disabling the supply of power to each of the plurality of functions for the current user, wherein the additional function information is the default function information; and executing, on at least one microprocessor, the plurality of functions using the function information of the profile data to determine whether the supply of power to each of the plurality of functions is to be enabled or disabled for the current user.

13. The authentication method of claim 12, wherein the biometric information for the current user is selected from the group consisting of a vein pattern, a fingerprint and a walking pattern.

14. The authentication method of claim 12, further comprising an act of:

if the biometric-information authentication determines that the current user is not authorized, allowing the current user limited access to one or more of the plurality of functions.

15. A recording device configured to record a program for use in a wearable device to be worn on a body of a current user, the recording device being configured to record the program to allow a computer to function as means comprising:

first storing means for:

storing first profile data for a first existing user comprising first biometric information for the first existing user and first function information for enabling a supply of power to a first subset of a plurality of functions available on the wearable device and for disabling a supply of power to a remainder of the plurality of functions for the first existing user, and second profile data for a second existing user comprising second biometric information for the second existing user and second function information for enabling a supply of power to a second subset of the plurality of functions and for disabling a supply of power to a remainder of the plurality of functions for the second existing user, the second subset of the plurality of functions being different than the first subset of the plurality of functions; and storing default function information for enabling a supply of power to a third subset of the plurality of functions and for disabling a supply of power to a remainder of the plurality of functions, wherein the third subset of the plurality of functions is different than each of the first subset of the plurality of functions and the second subset of the plurality of functions, and wherein the default function information is added to a new user profile when the new user profile is created;

detection means for detecting whether the wearable device is worn or not;

acquiring means for acquiring biometric information from the current user for biometric authentication when the detection means detects the wearable device is worn, and for acquiring no biometric information from the current user when the detection means detects the wearable device is not worn;

comparing means for comparing biometric information acquired from the current user with the biometric data for the first and second existing users;

identifying means for identifying the current user as a matching user of the first and second existing users when the biometric information acquired from the current user matches the biometric data for the matching user;

second storing means for storing new profile data for the current user when the biometric information acquired from the current user does not match the biometric data for the first or second existing users, the new profile data comprising the biometric information acquired from the current user and function information for enabling or disabling a supply of power to each of the plurality of functions for the current user, wherein the additional function information is the default function information; and executing means for executing the plurality of functions using the function information of the profile data to determine whether the supply of power to each of the plurality of functions is to be enabled or disabled for the current user.

16. The recording device according to claim 15, wherein the biometric information acquired from the current user is selected from the group consisting of a vein pattern, a fingerprint and a walking pattern.

17. The recording device according to claim 15, wherein the executing means is configured such that, if the biometric-information authentication determines that the current user is not authorized, the executing means allows the current user limited access to one or more of the plurality of functions.

* * * * *